(12) United States Patent
Takita et al.

(10) Patent No.: US 10,352,225 B2
(45) Date of Patent: Jul. 16, 2019

(54) METHOD AND SYSTEM FOR DIAGNOSING DETERIORATION OF EXHAUST EMISSION CONTROL CATALYST

(71) Applicant: Mazda Motor Corporation, Aki-gun, Hiroshima (JP)

(72) Inventors: Hiroyuki Takita, Hiroshima (JP); Mitsuharu Kaura, Higashihiroshima (JP); Susumu Takano, Hiroshima (JP); Yosuke Honda, Higashihiroshima (JP); Hidekazu Kashiro, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 352 days.

(21) Appl. No.: 14/616,997

(22) Filed: Feb. 9, 2015

(65) Prior Publication Data

US 2015/0247441 A1 Sep. 3, 2015

(30) Foreign Application Priority Data

Feb. 28, 2014 (JP) ................................. 2014-037700

(51) Int. Cl.
*F01N 11/00* (2006.01)
*F01N 3/08* (2006.01)
(Continued)

(52) U.S. Cl.
CPC .......... *F01N 11/005* (2013.01); *F01N 3/0835* (2013.01); *F01N 3/103* (2013.01);
(Continued)

(58) Field of Classification Search
CPC .................................................... F01N 11/005
(Continued)

(56) References Cited

U.S. PATENT DOCUMENTS 5,693,877 A * 12/1997 Ohsuga .............. B01D 53/8696
422/106
5,956,945 A * 9/1999 Kumar .................. F01N 11/007
60/274

(Continued)

FOREIGN PATENT DOCUMENTS

JP          10159543 A  *  6/1998  ........... F01N 3/0835
JP     2001295636 A     10/2001
(Continued)

OTHER PUBLICATIONS

English Translation of JP2001295636, Oct. 26, 2001.*
(Continued)

*Primary Examiner* — Son T Le
*Assistant Examiner* — Alexander A Mercado
(74) *Attorney, Agent, or Firm* — Alleman Hall Creasman & Tuttle LLP

(57) ABSTRACT

A method of diagnosing deterioration of an exhaust emission control catalyst is provided. The catalyst includes an HC (hydrocarbon) adsorbing part and an oxidation catalyst part. The method includes estimating that an HC discharge amount discharged from the HC adsorbing part is larger than a first value, detecting a parameter relating to a reaction heat of the exhaust emission control catalyst, and diagnosing that the exhaust emission control catalyst is deteriorated when the detected parameter indicates a temperature value lower than a predetermined threshold. The deterioration diagnosis is performed under a first condition that the HC discharge amount is estimated to be larger than the first value.

5 Claims, 10 Drawing Sheets

(51) Int. Cl.

| | | |
|---|---|---|
| *F01N 3/10* | (2006.01) | |
| *F02B 37/00* | (2006.01) | |
| F02B 29/04 | (2006.01) | |
| F02M 26/05 | (2016.01) | |
| F02M 26/06 | (2016.01) | |
| F02M 26/10 | (2016.01) | |
| F02M 26/15 | (2016.01) | |
| F02M 26/25 | (2016.01) | |
| F02M 26/24 | (2016.01) | |

(52) U.S. Cl.
CPC ............ *F01N 11/00* (2013.01); *F02B 37/004* (2013.01); *F01N 2430/06* (2013.01); *F01N 2550/02* (2013.01); *F01N 2550/03* (2013.01); *F02B 29/0406* (2013.01); *F02M 26/05* (2016.02); *F02M 26/06* (2016.02); *F02M 26/10* (2016.02); *F02M 26/15* (2016.02); *F02M 26/24* (2016.02); *F02M 26/25* (2016.02); *Y02T 10/144* (2013.01); *Y02T 10/20* (2013.01); *Y02T 10/47* (2013.01)

(58) Field of Classification Search
USPC ........................................................ 73/114.75
See application file for complete search history.

(56) References Cited

U.S. PATENT DOCUMENTS

| | | | | |
|---|---|---|---|---|
| 6,253,547 | B1 * | 7/2001 | Watanabe | B01D 53/9495 60/274 |
| 2002/0120386 | A1 * | 8/2002 | Shi | F01N 11/007 701/114 |
| 2005/0102998 | A1 * | 5/2005 | van Nieuwstadt | B01D 53/9431 60/277 |
| 2005/0103099 | A1 * | 5/2005 | van Nieuwstadt | F01N 3/2066 73/114.77 |
| 2005/0188679 | A1 * | 9/2005 | Miura | F01N 3/0821 60/277 |
| 2005/0188680 | A1 * | 9/2005 | Ueda | F01N 3/0835 60/277 |
| 2006/0101808 | A1 * | 5/2006 | Nakagawa | F01N 3/0814 60/277 |
| 2007/0234708 | A1 * | 10/2007 | Jones | F01N 11/00 60/277 |
| 2008/0092524 | A1 * | 4/2008 | Yokoyama | F01N 11/002 60/277 |
| 2010/0050602 | A1 * | 3/2010 | Fujimoto | F01N 11/007 60/277 |
| 2011/0126517 | A1 * | 6/2011 | Miyoshi | F01N 3/2066 60/274 |
| 2016/0376972 | A1 * | 12/2016 | Hagimoto | F01N 3/103 60/276 |

FOREIGN PATENT DOCUMENTS

| | | |
|---|---|---|
| JP | 2002021605 A | 1/2002 |
| JP | 2002089242 A | 3/2002 |
| JP | 2010112220 A | 5/2010 |
| JP | 2013142377 A | 7/2013 |

OTHER PUBLICATIONS

Studies in Surface Science and Catalysis, vol. 115, 1998, pp. 233-238.*
English Translation of JP 10159543, Jun. 1998.*

* cited by examiner

METHOD AND SYSTEM FOR DIAGNOSING DETERIORATION OF EXHAUST EMISSION CONTROL CATALYST

BACKGROUND

The present invention relates to a method and system for diagnosing deterioration of an exhaust emission control catalyst, which is provided inside an exhaust passage of an engine, and particularly to a method and system for diagnosing deterioration of an oxidative catalyst, which includes an HC adsorbing part.

For the purpose of purifying $NO_x$ (nitrogen oxide), HC (hydrocarbon), and CO (carbon monoxide) within exhaust gas to be discharged from engines (e.g., diesel engines and gasoline engines), exhaust emission control catalysts (e.g., three-way catalysts, oxidative catalysts, and $NO_x$ storage and reduction catalysts) are provided inside exhaust passages of the engines. When such exhaust emission control catalyst deteriorate, $NO_x$, HC, and CO are discharged outside a vehicle in which the engine concerned is installed, without being purified. Therefore, it becomes necessary to detect the deterioration of the exhaust emission control catalyst. Among such exhaust emission control catalysts, for exhaust emission control catalysts including an oxidative catalyst part for purifying HC by oxidation, since an amount of oxidative reaction heat produced when HC is oxidized becomes small due to the progression of the deterioration, the deterioration of the oxidative catalyst part can be determined by detecting the decrease in oxidative reaction heat. For example, JP2010-112220A discloses a deterioration diagnosing system of an exhaust emission control catalyst including such an oxidation catalyst part.

With the method disclosed in JP2010-112220A, an exhaust heat rate obtained by multiplying an exhaust gas temperature by an exhaust gas flow rate is calculated for parts of the exhaust passage on an entrance side and an exit side of the exhaust emission control catalyst, individually. Then an oxidative reaction heat rate produced within the exhaust emission control catalyst is calculated based on a difference between the exhaust heat rates on the entrance side and the exit side. When an integrated value of the oxidative reaction heat rates in a predetermined period of time is smaller than a threshold determined for the deterioration diagnosis, the exhaust emission control catalyst is determined as deteriorated.

In other words, in JP2010-112220A, regarding the deterioration diagnosis based on the oxidative reaction heat produced within the exhaust emission control catalyst, the oxidative reaction heat rate calculated based on the exhaust gas flow rate is used as a diagnostic parameter, so as to reduce a false deterioration determination of the exhaust emission control catalyst which occurs when an oxidized amount changes due to a change of the exhaust gas flow rate and the detected oxidative reaction heat varies.

Meanwhile, due to the tightening of exhaust gas regulations in recent years, discussion has occurred regarding introducing exhaust emission control catalysts provided with an HC adsorbing part having a function to adsorb HC discharged from the engine when a temperature of the HC adsorbing part is low, and discharging the adsorbed HC when the temperature of the HC adsorbing part is high. Such an exhaust emission control catalyst provided with the HC adsorbing part can temporarily adsorb HC when the exhaust emission control catalyst is not activated and HC cannot sufficiently be purified, and it can discharge and purify the adsorbed HC after the exhaust emission control catalyst is activated. Therefore, HC discharged outside the vehicle can be reduced.

In performing the deterioration diagnosis of the exhaust emission control catalyst based on the oxidative reaction heat rate, the diagnosis is preferably performed when the oxidative reaction heat rate is obtained many times. With the method disclosed in JP2010-112220A, under a warmed-up state of the engine (paragraph[0037]), "the deterioration diagnosis is permitted when one of the following conditions is met: a period of time for which the heat rates are integrated is over a predetermined period of time; a travel distance of the vehicle in a period of time for which the heat rates are integrated is over a predetermined value; and the integrated value of the output of the vehicle in a period of time for which the heat rates are integrated is over a predetermined value." In other words, the deterioration diagnosis is performed when an absolute value of the heat rate becomes large.

On the other hand, since temperature sensors generally cause detection errors, if the heat rate is calculated by integrating the oxidative reaction heat rates per unit time over a comparatively long period of time, the error of the temperature sensor also accumulates and the diagnostic accuracy degrades.

SUMMARY

The present invention is made in view of the above situations and provides a method and system of diagnosing deterioration of an exhaust emission control catalyst, which is improved in the accuracy of the deterioration diagnosis of the exhaust emission control catalyst provided with a HC adsorbing part.

According to one aspect of the present invention, a method of diagnosing deterioration of an exhaust emission control catalyst is provided. The exhaust emission control catalyst includes an HC adsorbing part and an oxidation catalyst part. The HC adsorbing part is disposed inside an exhaust passage of an engine and for adsorbing HC within exhaust gas when a temperature of the HC adsorbing part is lower than an HC dischargeable temperature and discharging the adsorbed HC when the temperature of the HC adsorbing part is the HC dischargeable temperature or higher. The oxidation catalyst part purifies, by oxidation, the HC discharged from the HC adsorbing part and the HC within the exhaust gas under a high temperature. The method includes estimating that an HC discharge amount discharged from the HC adsorbing part is larger than a first value, detecting a parameter relating to a reaction heat of the exhaust emission control catalyst, and diagnosing that the exhaust emission control catalyst is deteriorated when the detected parameter indicates a temperature value lower than a predetermined threshold. The deterioration diagnosis is performed under a first condition that the HC discharge amount is estimated to be larger than the first value.

According to the above method, in a state where the discharge amount of HC (an unburned component discharged from the HC adsorbing part) increases, in other words, in a state where the temperature of the exhaust emission control catalyst becomes sufficiently high due to an oxidative reaction heat, in a case of performing the deterioration diagnosis according to a producing state of the oxidative reaction heat detected by a temperature sensor, the deterioration diagnosis of the exhaust emission control catalyst can be performed accurately by reducing a detection error (total error of detection values) of the temperature sensor to be small.

The method may also include estimating that a total HC adsorb amount adsorbed by the HC adsorbing part is larger than a second value. The deterioration diagnosis may be performed under a second condition that the total HC adsorb amount is estimated to be larger than the second value in addition to the first condition.

In this case, because the deterioration diagnosis is performed under the condition that the total HC adsorb amount in the HC adsorbing part is large, in other words, a large amount of HC which is the unburned component is discharged from the HC adsorbing part continuously over a long period of time, the deterioration diagnosis can be performed more accurately.

The method may also include estimating that a total amount of unburned fuel discharged from the engine is larger than a third value. The deterioration diagnosis may be performed under a third condition that the total amount of unburned fuel is estimated to be larger than the third value in addition to the first condition.

In this case, the deterioration diagnosis can be performed accurately by performing it under the condition that the total amount of the unburned fuel is large, in other words, the temperature of the exhaust emission control catalyst is increased to be sufficiently high by the oxidative reaction heat produced from the unburned fuel.

The method may include also include detecting that the engine is in a cold-start state. The deterioration diagnosis may be performed under a fourth condition that the first condition is satisfied for the first time after the engine is detected to be in the cold-start state.

In this case, because the state where the cold-start of the engine is performed is considered as a state where a large amount of HC is adsorbed by the HC adsorbing part due to a large amount of HC component within the exhaust gas, a large amount of HC is discharged from the HC adsorbing part continuously over a long period of time after the HC discharge amount from the HC adsorbing part reaches the first value for the first time after the cold-start of the engine. Thereby, the deterioration diagnosis can be performed more accurately.

The method may also include detecting that a temperature of the exhaust gas is higher than a predetermined temperature. The deterioration diagnosis may be performed under a fifth condition that the exhaust gas temperature is higher than the predetermined temperature in addition to the first condition.

This is preferable in preventing false determination of the deterioration diagnosis because the deterioration diagnosis is not performed when the exhaust gas temperature is unsuitably low for deterioration diagnosis, in other words, the exhaust emission control catalyst is difficult to be high.

The method may also include estimating the total HC adsorb amount adsorbed by the HC adsorbing part. The estimated HC discharge amount may become larger as the estimated total HC adsorb amount becomes larger.

In this case, the HC discharge amount can be accurately estimated, which is preferable in performing the deterioration diagnosis highly accurately.

The method may also include detecting a pressure of the exhaust gas discharged from the engine. The estimated HC discharge amount may become larger as the detected exhaust gas pressure becomes lower.

In this case, the HC discharge amount can be accurately estimated, which is preferable in performing the deterioration diagnosis highly accurately.

The method may also include detecting the temperature of the HC adsorbing part. The estimated HC discharge amount may become larger as the temperature of the HC adsorbing part becomes higher.

In this case, the HC discharge amount can be accurately estimated, which is preferable in performing the deterioration diagnosis highly accurately.

According to another aspect of the present invention, a deterioration diagnosing system for an exhaust emission control catalyst is provided. The exhaust emission control catalyst includes an HC (hydrocarbon) adsorbing part and an oxidation catalyst part. The HC adsorbing part is disposed inside an exhaust passage of an engine and for adsorbing HC within exhaust gas when a temperature of the HC adsorbing part is lower than an HC dischargeable temperature and discharging the adsorbed HC when the temperature of the HC adsorbing part is the HC dischargeable temperature or higher. The oxidation catalyst part purifies, by oxidation, the HC discharged from the HC adsorbing part and the HC within the exhaust gas under a high temperature. The system includes an HC discharge amount calculating module for estimating that an HC discharge amount discharged from the HC adsorbing part is larger than a first value, a parameter detecting module for detecting a parameter relating to a reaction heat of the exhaust emission control catalyst, and a deterioration diagnosing module for diagnosing that the exhaust emission control catalyst is deteriorated when the parameter detected by the parameter detecting module indicates a temperature value lower than a predetermined threshold. The deterioration diagnosis is performed by the deterioration diagnosing module when the HC discharge amount is estimated to be larger than the first value by the HC discharge amount calculating module According to the above configuration, in a state where the discharge amount of HC (an unburned component discharged from the HC adsorbing part) increases, in other words, in a state where the temperature of the exhaust emission control catalyst becomes sufficiently high due to an oxidative reaction heat, in a case of performing the deterioration diagnosis according to a producing state of the oxidative reaction heat detected by a temperature sensor, the deterioration diagnosis of the exhaust emission control catalyst can be performed accurately by reducing a detection error (total error of detection values) of the temperature sensor to be small.

The system may also include a total HC adsorb amount calculating module for estimating that a total HC adsorb amount adsorbed by the HC adsorbing part is larger than a second value. The deterioration diagnosis may be performed by the deterioration diagnosing module when the HC discharge amount is estimated to be larger than the first value by the HC discharge amount calculating module and the total HC adsorb amount is estimated to be larger than the second value by the total HC adsorb amount calculating module.

In this case, because the deterioration diagnosis is performed under the condition that the total HC adsorb amount in the HC adsorbing part is large, in other words, a large amount of HC which is the unburned component is discharged from the HC adsorbing part continuously over a long period of time, the deterioration diagnosis can be performed more accurately.

DETAILED DESCRIPTION OF EMBODIMENT

Figure 1:
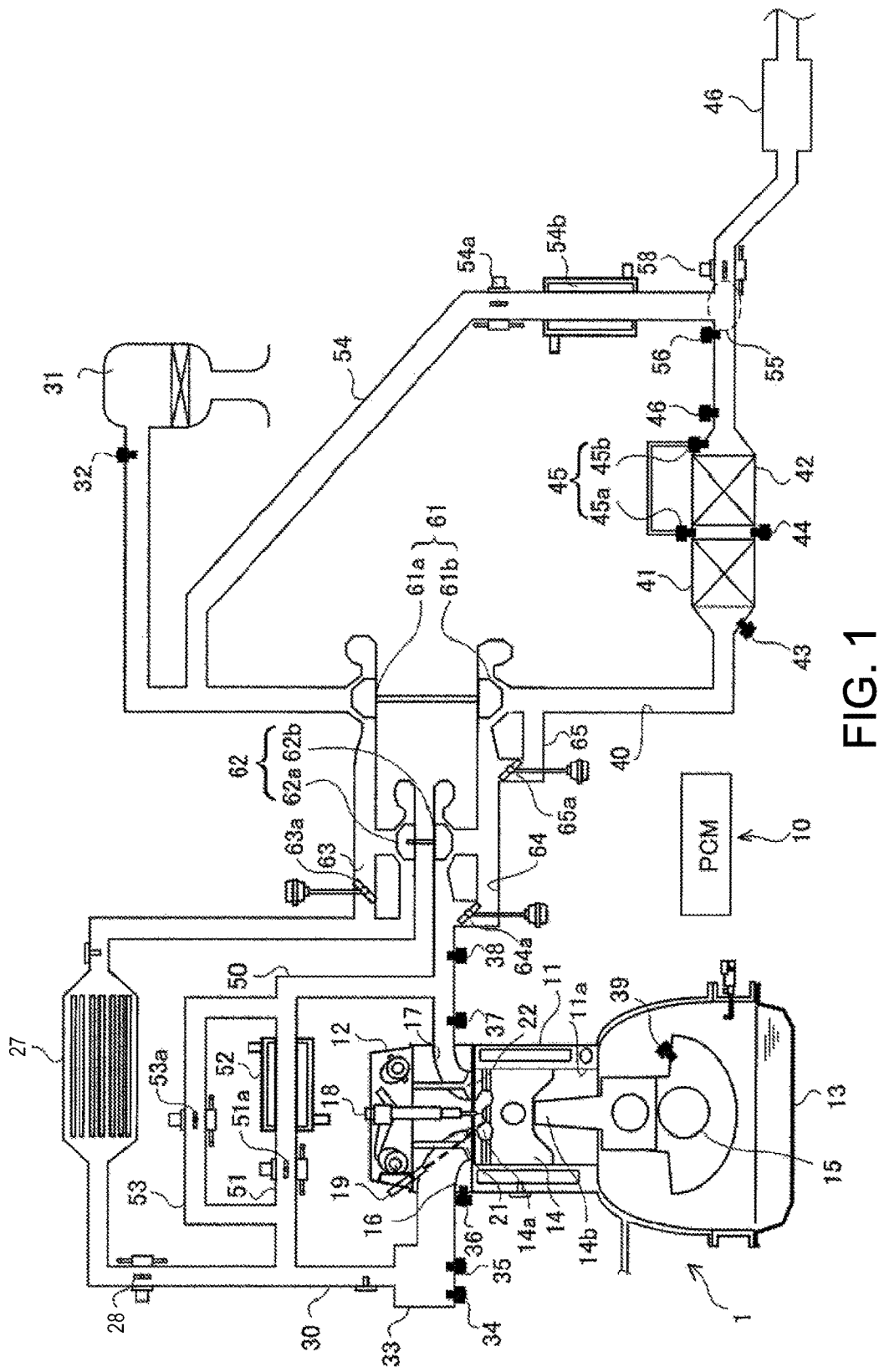
FIG. 1 is a view of an overall configuration of an engine to which the present invention is applied in one embodiment.

FIG. 1 is a view of an overall configuration of an engine 1 according to the present invention. The engine 1 is a diesel engine that is installed in a vehicle and supplied with a fuel mainly containing a diesel fuel. The engine 1 includes a cylinder block 11 provided with a plurality of cylinders 11a (only one cylinder is illustrated in FIG. 1), a cylinder head 12 disposed on the cylinder block 11, and an oil pan 13 disposed below the cylinder block 11, where a lubricant is stored. Inside each of the cylinders 11a of the engine 1, a reciprocatable piston 14 is fitted, and a cavity forming a reentrant-shaped combustion chamber 14a is formed on a top face of the piston 14. The pistons 14 are coupled to a crankshaft 15 via connecting rods 14b, respectively.

In the cylinder head 12, an intake port 16 and an exhaust port 17 are formed for each cylinder 11a, and an intake valve 21 for opening and closing the intake port 16 on the combustion chamber 14a side and an exhaust valve 22 for opening and closing the exhaust port 17 on the combustion chamber 14a side are provided for each cylinder 11a.

In a valve train system of the engine 1 for operating the intake and exhaust valves 21 and 22, a hydraulically-actuated variable valve motion mechanism (hereinafter, referred to as the VVM) for switching an operation mode of the exhaust valve 22 between a normal mode and a special mode is provided on the exhaust side. In the normal mode, the exhaust valve 22 is opened only once during exhaust stroke, and in the special mode, the exhaust valve 22 operates a so-called exhaust open-twice control in which it opens once during exhaust stroke and once more during intake stroke.

In the cylinder head 12, an injector 18 for injecting the fuel and a glowplug 19 for heating intake air within the cylinder 11a in a cold start of the engine 1 to improve ignitability of the fuel are provided for each cylinder 11a. The injector 18 is arranged such that its fuel injection port is oriented toward the inside of the combustion chamber 14a from a ceiling face of the combustion chamber 14a, so that it directly supplies the fuel inside the combustion chamber 14a basically near a compression top dead center (CTDC).

To one side face of the engine 1, an intake passage 30 is connected to communicate with the intake ports 16 of the respective cylinders 11a. To the other side face of the engine 1, an exhaust passage 40 is connected to guide out burned gas (exhaust gas) discharged from the combustion chambers 14a of the cylinders 11a. A large turbocharger 61 and a small turbocharger 62 for turbocharging the intake air are disposed in the intake and exhaust passages 30 and 40.

An air cleaner 31 for filtrating intake air is disposed in an upstream end part of the intake passage 30. A surge tank 33 is disposed near a downstream end of the intake passage 30. A part of the intake passage 30 downstream of the surge tank 33 is branched to be independent passages extending toward the respective cylinders 11a, and downstream ends of the independent passages are connected to the intake ports 16 of the cylinders 11a, respectively.

Compressors 61a and 62a of the large and small turbochargers 61 and 62, an intercooler 27 for cooling air compressed by the compressors 61a and 62a, and a throttle valve 28 for adjusting an intake air amount for the combustion chambers 14a of the respective cylinders 11a are disposed in a part of the intake passage 30 between the air cleaner 31 and the surge tank 33. The throttle valve 28 is basically fully opened, but it is fully closed when the engine is stopped so as to avoid a shock.

A part of the intake passage 30 between the surge tank 33 and the throttle valve 28 (i.e., a part downstream of the small compressor 62a of the small turbocharger 62) is connected to a part of the exhaust passage 40 between an exhaust manifold and a small turbine 62b of the small turbocharger 62 (i.e., a part upstream of the small turbine 62b of the small turbocharger 62) by an EGR passage 50 for recirculating a part of the exhaust gas back to the intake passage 30 (high-pressure EGR system). The EGR passage 50 includes a main passage 51 where an EGR cooler 52 and an exhaust gas recirculation valve 51a for adjusting a recirculation amount of the exhaust gas to the intake passage 30 are disposed, and a cooler bypass passage 53 bypassing the EGR cooler 52. A cooler bypass valve 53a for adjusting a flow rate of the exhaust gas flowing through the cooler bypass passage 53 is disposed inside the cooler bypass passage 53.

Separately to the high-pressure EGR system, as a low-pressure EGR system, a part of the intake passage 30 upstream of the large compressor 61a of the large turbocharger 61 is connected to a part of the exhaust passage 40 downstream of a diesel particulate filter (DPF) 42 by an EGR passage 54 for recirculating a part of the exhaust gas back to the intake passage 30 via an EGR extracting section 55 formed in the exhaust passage 40. Moreover, the EGR passage 54 is provided with an EGR cooler 54b for cooling the exhaust gas and a low-pressure EGR valve 54a. Furthermore, an exhaust throttle valve 58 is disposed in a part of the exhaust passage 40 downstream of the EGR extracting section 55, and the exhaust throttle valve 58 adjusts the recirculation amount of the exhaust gas in the low-pressure EGR system to the intake passage 30 by controlling openings of the EGR valve 54a and the exhaust throttle valve 58 according to an operating state of the engine.

An upstream part of the exhaust passage 40 includes the exhaust manifold. The exhaust manifold has independent passages branched toward the respective cylinders 11a and connected to respective external ends of the exhaust ports 17, and a manifold section where the independent passages merge together.

A part of the exhaust passage 40 downstream of the exhaust manifold is provided with the turbine 62b of the small turbocharger 62, the turbine 61b of the large turbocharger 61, an exhaust emission control catalyst 41 for purifying HC and CO within the exhaust gas by oxidation, the DPF 42 for capturing diesel particulates, and a silencer 29, in this order from the upstream side. Note that, the exhaust emission control catalyst 41 and the DPF 42 are accommodated in a single case.

Figure 2:
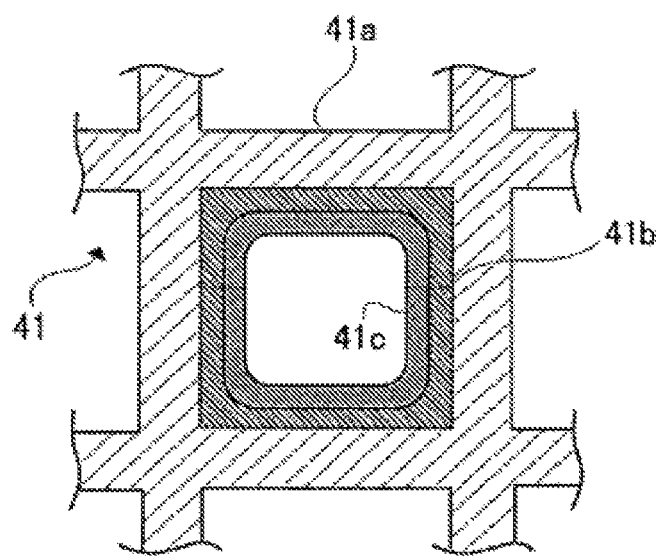
FIG. 2 is a partial view illustrating one example of an exhaust emission control catalyst to which the present invention is applied in the embodiment, in an enlarged manner.

FIG. 2 illustrates a part of the exhaust emission control catalyst 41 in an enlarged manner. The exhaust emission control catalyst 41 includes a carrier 41a formed of a honeycomb structure made of cordierite, an oxidation catalyst part 41b supported by a wall surface of penetration holes formed in the carrier 41a, and an HC adsorbing part 41c. The HC adsorbing part 41c is a zeolite crystal formed with a number of fine pores that are approximately 0.5 mm in diameter. When the engine is at a low temperature (e.g., in the cold start), HC molecules within the exhaust gas are adsorbed by being trapped at the fine pores of zeolite, and when the engine is at a high temperature, the adsorbed HC molecules are discharged by vibrating and desorbing from the fine pores of zeolite. Moreover, the oxidation catalyst part 41b is made of a catalyst metal, such as platinum (Pt) and palladium (Pd), and has a function of, upon its activation caused from being heated to a predetermined temperature, purifying, by oxidation, HC and CO within the exhaust gas discharged from the engine as well as HC discharged from the HC adsorbing part 41c. In other words, the exhaust emission control catalyst 41 has a function of temporarily adsorbing HC when the exhaust emission control catalyst is not activated (e.g., in the cold start) and HC cannot sufficiently be purified, and then to discharge and purify the adsorbed HC after the exhaust emission control catalyst is activated.

The diesel engine 1 with the configuration as described above is controlled by a powertrain control module (hereinafter, may be referred to as the PCM) 10 which performs an overall control of the engine. The PCM 10 is comprised of a microprocessor including a memory, a CPU, a counter timer group, an interface, and paths for connecting these units. The PCM 10 receives signals from, for example, an airflow sensor 32 for detecting an intake air amount at a position downstream of the air cleaner, an intake pressure sensor 34 attached to the surge tank 33 and for detecting a pressure of air to be supplied to the combustion chambers 14a, an intake air temperature sensor 35 attached to the surge tank 33 and for detecting a temperature of the intake air, a fluid temperature sensor 36 for detecting a temperature of an engine coolant, an exhaust gas pressure sensor 37 for detecting an exhaust gas pressure at a position downstream of the exhaust ports 17, an engine speed sensor 39 for detecting an engine speed by detecting a rotational angle of the crankshaft 15, an exhaust-emission-control-catalyst upstream exhaust gas temperature sensor 43 for detecting an exhaust gas temperature at a position upstream of the exhaust emission control catalyst 41, an exhaust-emission-control-catalyst downstream exhaust gas temperature sensor 44 for detecting an exhaust gas temperature at a position downstream of the exhaust emission control catalyst 41, a DPF pressure difference sensor 45 for detecting a pressure difference $\Delta P$ between upstream and downstream sides of the DPF 42 ((a pressure P1 on the upstream side of the DPF)−(a pressure P2 on the downstream side of the DPF)), a linear $O_2$ sensor 46 for detecting an oxygen concentration within the exhaust gas, and an accelerator opening sensor (not illustrated) for detecting an accelerator opening corresponding to an operation amount of an acceleration pedal of the vehicle. By performing various kinds of operations based on these signals, the PCM 10 determines the state of the engine 1 and further the vehicle, and accordingly outputs control signals to actuators of the injectors 18, the glowplugs 19, the VVM of the valve train (not illustrated), and various valves 28, 51a, 63a, 64a and 65a. When an exhaust emission control catalyst diagnosing system 120 (described later) determines that the exhaust emission control catalyst 41 is deteriorated, the PCM 10 outputs a signal to activate an alarm device 130.

Further, the engine 1 is configured to have a comparatively low compression ratio, in which a geometric compression ratio is between 12:1 and 15:1 (e.g., 14:1), so as to improve exhaust emission performance and thermal efficiency.

(Outline of Combustion Control of Engine)

A normal control of the engine 1 performed by the PCM 10 is for determining a target torque (i.e., a targeted load) based mainly on the accelerator opening, and achieving a fuel injection amount, a fuel injection timing, and the like corresponding to the target torque by controlling the operation of the injectors 18. The target torque is set to be higher as the accelerator opening becomes larger, and also to reach its highest value when the engine speed is around 2,000 rpm. The fuel injection amount per predetermined crank rotation amount is set based on the target torque. The fuel injection amount is set larger as the target torque becomes higher, and the fuel is injected every time the crankshaft rotates by the predetermined rotation amount, here at predetermined timings between a late stage of the compression stroke and an early stage of expansion stroke which is every time the crankshaft fully rotates twice. Note that regarding the fuel injection control in this embodiment, for example, the engine disclosed in JP2012-012972A, a plurality of operating ranges are set according to the engine load and the engine speed, and fuel injections at five timings including a pilot injection, a pre-injection, a main injection, an after injection, and a post injection are controlled, so as to reduce $NO_x$ and soot within the exhaust gas, reduce noises and vibrations, improve a fuel consumption, and increase the torque.

When a captured amount of PM by the DPF 42 exceeds a predetermined amount, a post injection into the combustion chamber of the engine 1 is performed by the injector 18 at a predetermined timing between a late stage of the expansion stroke and exhaust stroke (DPF regenerating processing) to prevent the increase of back pressure of the engine 1 due to the clogging of the DPF 42. After the post injection is performed, unburned fuel is discharged to the exhaust passage and the unburned fuel is oxidized by the exhaust emission control catalyst 41, and therefore, the oxidative reaction heat produced by the oxidation increases a temperature of the DPF 42, and thus the PM accumulated in the DPF 42 is burned, and as a result, the DPF 42 is regenerated.

In other words, the exhaust emission control catalyst 41 has, in addition to the above-described function of purifying, by the oxidation, the unburned fuel discharged from the engine, but also the function of increasing the temperature of the DPF 42. When the deterioration of the exhaust emission control catalyst 41 progresses due to, for example, heat or poisoning by sulfur contained in the fuel and oil, since the functions described above cannot be exerted sufficiently, it becomes necessary to detect that the exhaust emission control catalyst 41 is deteriorated and to inform a person on board of the deterioration of the exhaust emission control catalyst 41 to suggest an exchange. Therefore, the PCM 10 includes an exhaust emission control catalyst deterioration diagnosing system.

Figure 3:
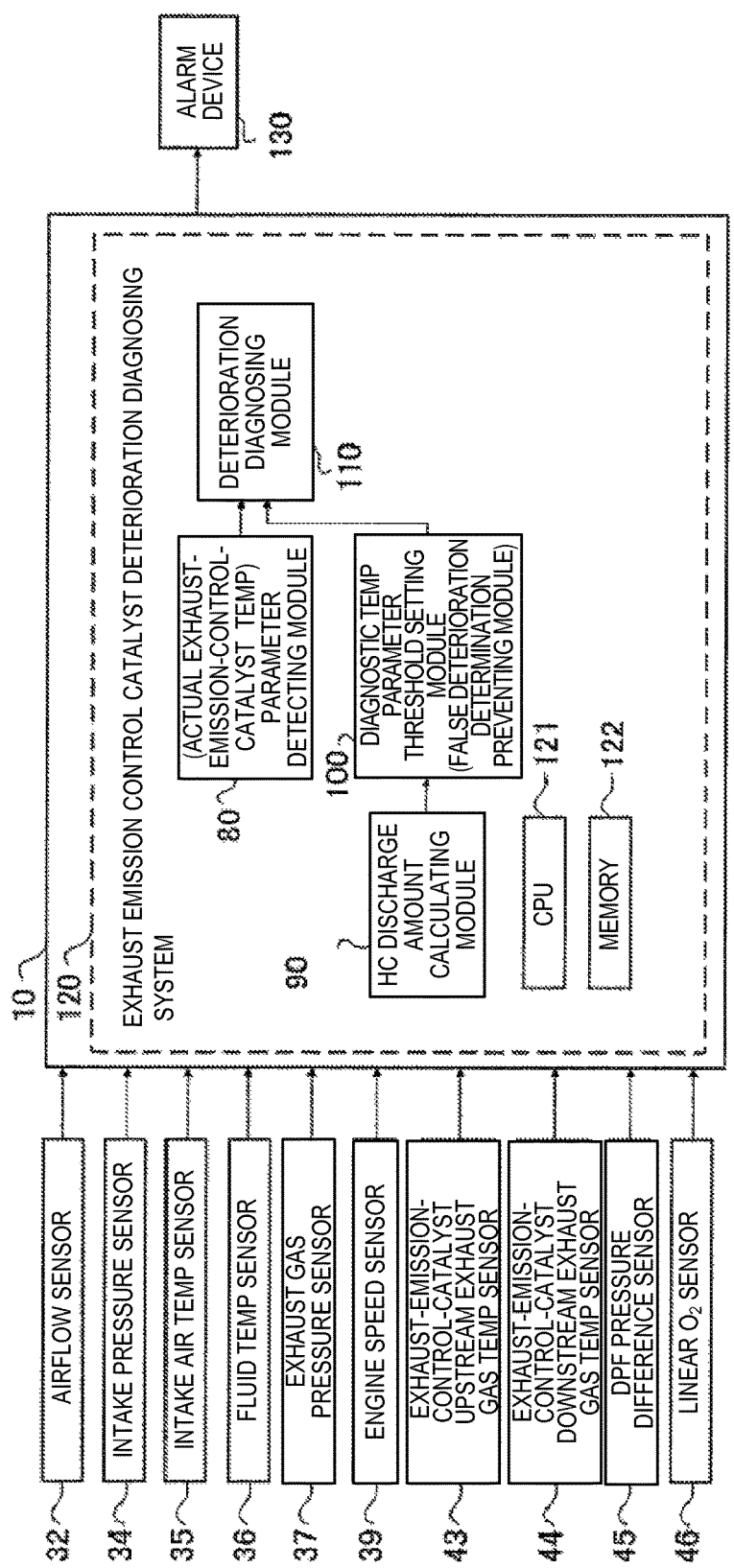
FIG. 3 is an overall block diagram illustrating one example of a control system for performing an exhaust emission control catalyst deterioration diagnosis according to the embodiment of the present invention.

FIG. 3 is an overall block diagram illustrating one example of a control system for performing an exhaust emission control catalyst deterioration diagnosis according to the embodiment of the present invention. The PCM 10 includes an exhaust emission control catalyst deterioration diagnosing system 120 for diagnosing the deterioration of the exhaust emission control catalyst 41. The exhaust emission control catalyst deterioration diagnosing system 120 receives the signals from, for example, the airflow sensor 32, the intake pressure sensor 34, the intake air temperature sensor 35, the fluid temperature sensor 36, the exhaust gas pressure sensor 37, the engine speed sensor 39, the exhaust-emission-control-catalyst upstream exhaust gas temperature sensor 43, the exhaust-emission-control-catalyst downstream exhaust gas temperature sensor 44, the DPF pressure difference sensor 45, and the linear $O_2$ sensor 46, and a later-described deterioration diagnosis is performed by the exhaust emission control catalyst deterioration diagnosing system 120 by using these signals.

The exhaust emission control catalyst deterioration diagnosing system 120 includes an actual exhaust-emission-control-catalyst temperature parameter detecting module (Parameter Detecting Module) 80 for detecting a parameter relating to a reaction heat of the exhaust emission control catalyst and for calculating an actual exhaust-emission-control-catalyst temperature parameter based on the detection value of the exhaust-emission-control-catalyst downstream exhaust gas temperature sensor 44, an HC discharge amount calculating module 90 for calculating an HC amount discharged from the HC adsorbing part 41c (adsorbed-HC discharge amount) and for estimating that the HC discharge amount discharged from the HC adsorbing part is larger than a first value, a diagnostic temperature parameter threshold setting module 100 for receiving a signal from the HC discharge amount calculating module 90 and setting a diagnostic temperature parameter threshold, a deterioration determining module (deterioration diagnosing module) 110 for determining the deterioration of the exhaust emission control catalyst by comparing a signal from the actual exhaust-emission-control-catalyst temperature parameter detecting module 80 with a signal from the diagnostic temperature parameter threshold setting module 100 and for diagnosing that the exhaust emission control catalyst is deteriorated when the parameter detected by the parameter detecting module indicates a temperature value lower than a predetermined threshold, a CPU 121 for performing various operations within the exhaust emission control catalyst deterioration diagnosing system, and a memory 122 for storing parameters calculated by the operations.

Although the details are described later, by comparing the diagnostic temperature parameter threshold (in this embodiment, corresponding to a supply reaction heat rate Qdoc#in in a predetermined period of time, which is estimated to be produced by the exhaust emission control catalyst in a non-deteriorated state) with the actual exhaust-emission-control-catalyst temperature parameter (in this embodiment, corresponding to an actual reaction heat rate Qdoc in a predetermined period of time, which is detected based on the signal from the exhaust-emission-control-catalyst downstream exhaust gas temperature sensor 44, etc.) based on the signal from the HC discharge amount calculating module 90 to determine the deterioration of the exhaust emission control catalyst, the influence of the oxidative reaction heat added by HC discharged from the HC adsorbing part is removed and the false deterioration determination of the exhaust emission control catalyst 41 due to the HC discharged from the HC adsorbing part is prevented. In other words, in this embodiment, the diagnostic temperature parameter threshold setting module 100 for setting the diagnostic temperature parameter threshold based on the adsorbed-HC discharge amount serves as a false deterioration determination preventing module for preventing the deterioration determining module from performing false determinations because of the increase of the actual exhaust-emission-control-catalyst temperature parameter due to the increase of the adsorbed-HC discharge amount.

When the exhaust emission control catalyst deterioration diagnosing system 120 determines that the exhaust emission control catalyst is deteriorated, the PCM 10 outputs the signal to activate the alarm device 130.

(Example of Control of Deterioration Diagnosis)

Figure 4:
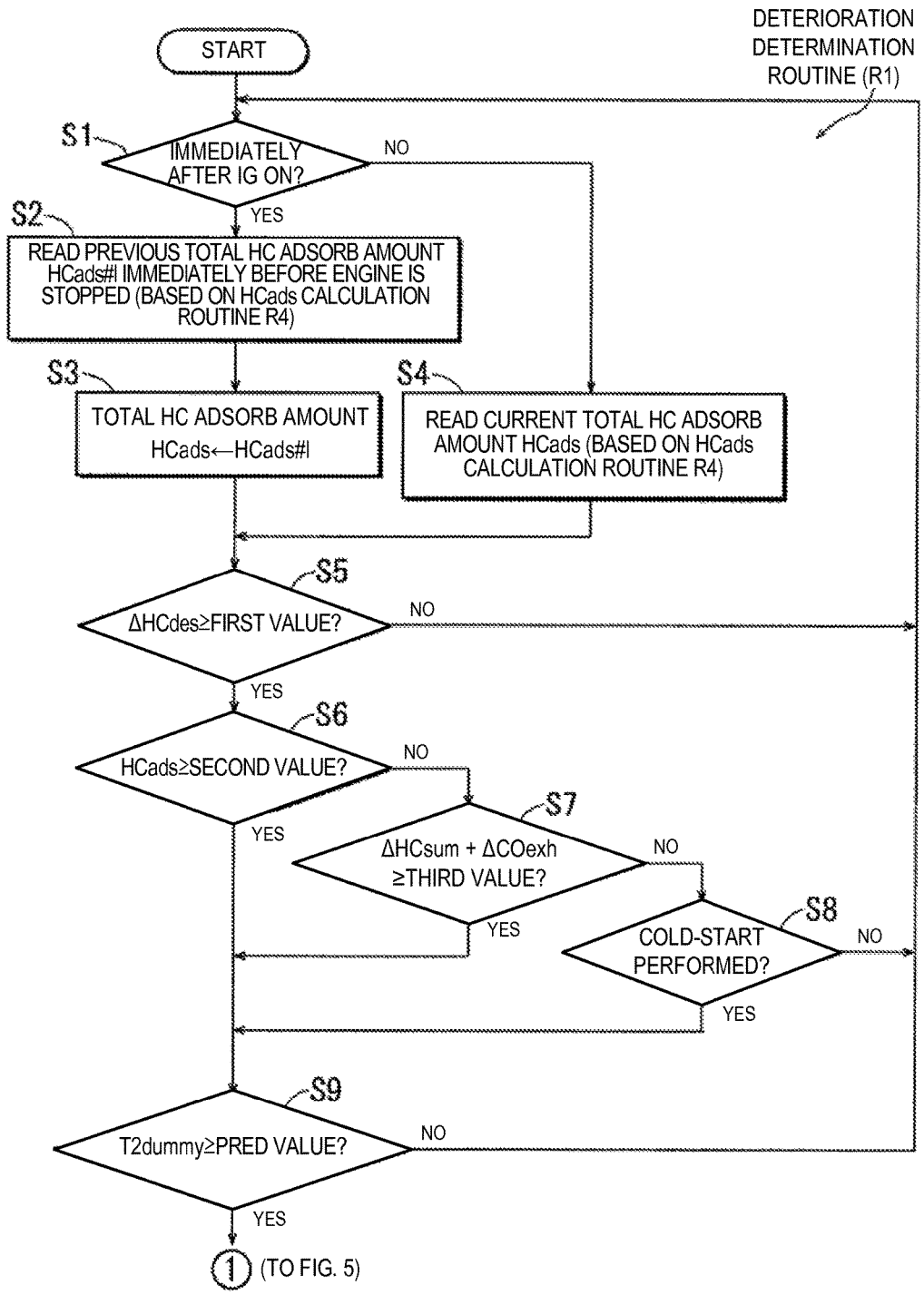
FIG. 4 is a flowchart of a part of a main routine (R1) of one example of a diagnostic control of deterioration of the exhaust emission control catalyst according to the embodiment of the present invention.
Figure 5:
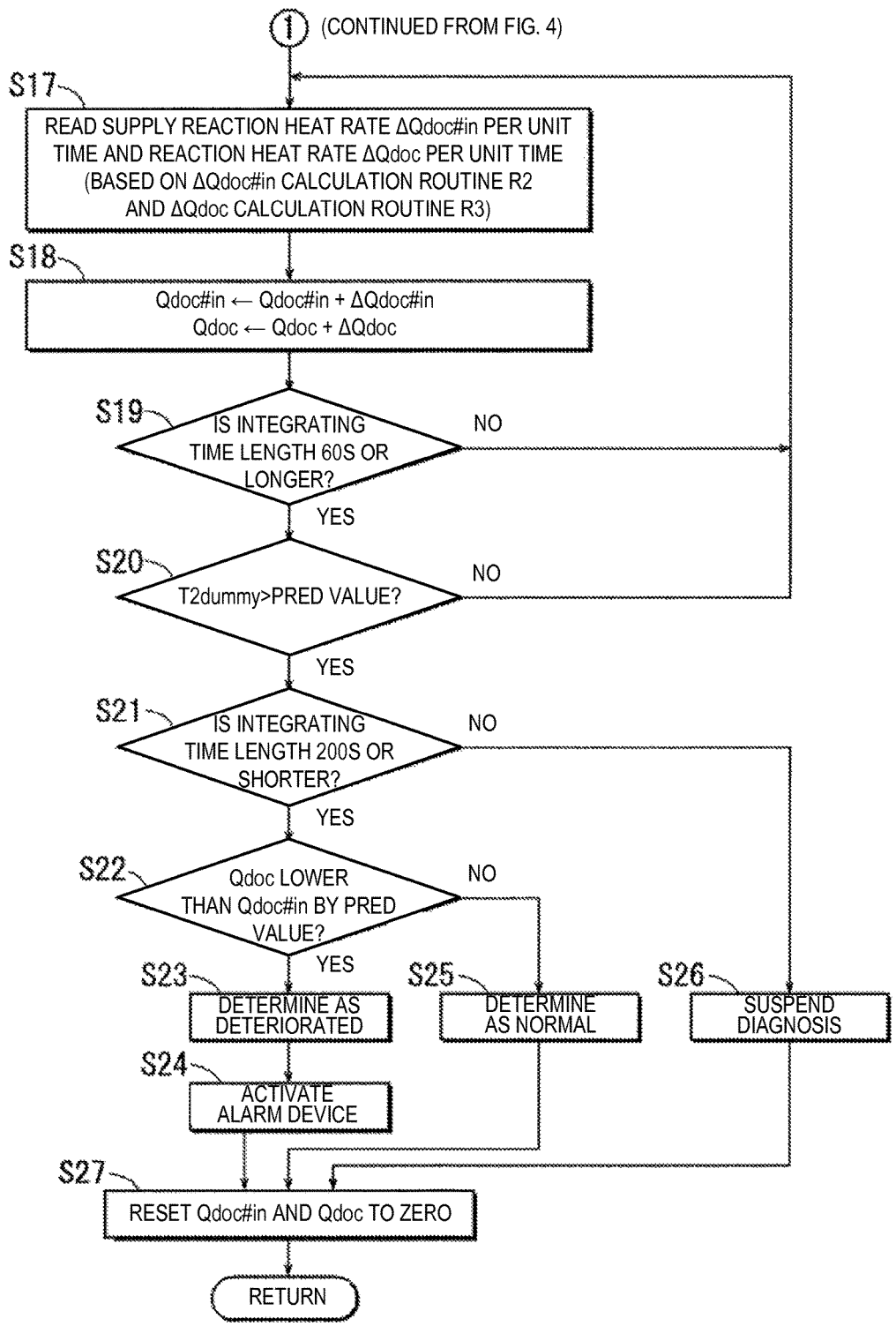
FIG. 5 is a flowchart of the rest of the main routine (R1) in FIG. 4.

FIGS. 4 and 5 show a flowchart (R1) of a main routine for the diagnostic control of the exhaust emission control catalyst deterioration diagnosing system. First, when the ignition (IG) is turned on, at S1, whether a current timing is immediately after the IG is turned on is determined, and if it is immediately after the IG is turned on, a previous total HC adsorb amount HCads#1 immediately before the engine is stopped, which is stored in the memory 122, is read (S2), and HCads#1 is set as a current total HC adsorb amount HCads (S3). Although the details are described with reference to the flowchart of a subroutine for calculating the total HC adsorb amount in FIG. 9, if the IG is turned off while a temperature of the HC adsorbing part is lower than a predetermined temperature, since a predetermined amount of HC still remains adsorbed by the HC adsorbing part, the predetermined amount of HC needs to be taken into consideration in calculating the total HC adsorb amount. Thus, a total HC adsorb amount HCcads#1 immediately before the IG is turned off is stored in the memory 122, and when the engine is started next time, HCcads#1 is set as an initial value of the total HC adsorb amount HCads. On the other hand, if it is determined that the current timing is not immediately after the IG is turned on at S1, the current total HC adsorb amount HCads is read. The current total HC adsorb amount HCads is calculated sequentially as described with reference to the flowchart of the subroutine for calculating the total HC adsorb amount in FIG. 9, and a latest value of the calculation result is stored in the memory 122, and therefore, the stored HCads is read to obtain the current total HC adsorb amount HCads. Sequentially, at S5 and S6, whether predetermined diagnosis executing conditions of the deterioration determination of the exhaust emission control catalyst are met is determined.

S5 to S9 are condition determinations for executing the deterioration diagnosis. That is, to explain briefly, S5 to S8 are condition determinations of whether the unburned fuel is sufficiently supplied to the exhaust emission control catalyst 41. Moreover, S9 is a determination of whether the exhaust emission control catalyst 41 is sufficiently activated.

Specifically, at S5, whether the adsorbed-HC discharge amount (ΔHCdes) per unit time from the HC adsorbing part 41c is larger than a first value (e.g., 0.01 g) is determined. If the result of this determination at S5 is positive, at the control proceeds to S6, where it is determined whether the total HC adsorb amount (HCads) at the HC adsorbing part 41c is larger than a second value (e.g., 0.5 g). If the result of the determination at S6 is positive, it is considered that the adsorbed-HC discharge amount from the HC adsorbing part 41c is large and the discharge amount is going to be continuously large, and the flow proceeds to S9. Note that a total HC supply amount ΔHCsum to the exhaust emission control catalyst 41 per unit time, as described later, is calculated by adding an engine HC discharge amount ΔHCexh and the adsorbed-HC discharge amount ΔHCdes. Here, the engine HC discharge amount ΔHCexh changes depending on the state of the engine (e.g., the accelerator opening), and therefore, the deterioration diagnosis is preferably performed while the accelerator opening is stable within a predetermined range.

If the result of the determination at S6 is negative, the flow proceeds to S7, where whether an added value (ΔHCsum+ ΔCOexh) of the total HC supply amount (ΔHCsum) to the exhaust emission control catalyst 41 per unit time and a CO discharge amount ΔCOexh discharged from the engine per unit time is larger than a third value (e.g., 0.13 g) is determined. If the result of the determination at S7 is positive, the flow proceeds to S9.

If the result of the determination at S7 is negative, at S8, whether a cold start of the engine was performed is determined. More specifically, whether the result of the determination at S5 is positive for the first time after the cold start of the engine is determined. In other words, in the cold start of the engine, although the air-fuel ratio is rich, since the combustibility is poor, the exhaust gas contains a large amount of HC which is the unburned component, and the large amount of HC is adsorbed by the HC adsorbing part 41c. Therefore, if the determination at S8 results in being positive for the first time after the cold start of the engine, the HC adsorbing part 41c can be considered to be in a situation that the large amount of HC is adsorbed thereby and the large amount of HC is to be discharged therefrom continuously over a long period of time. Thus, also in this case, the flow proceeds to S9.

If the result of the determination is negative at S5 or S8, the deterioration diagnosis is considered to be unsuitable at this point, and the flow returns to S1.

As described above, the positive result of the determination at S6, S7, or S8 indicates that a state where the amount of unburned fuel to be supplied to the exhaust emission control catalyst 41 increases is confirmed. Here, at S9, whether a temperature T2dummy on the immediately downstream side of the exhaust emission control catalyst 41 is higher than a predetermined temperature which is an activation temperature (e.g., 160° C.) is determined. If the result of the determination at S9 is negative, the temperature of the exhaust emission control catalyst 41 is not high enough to perform the deterioration diagnosis, and therefore, the flow returns to S1. Note that S9 corresponds to a determination of whether the exhaust gas temperature is higher than a predetermined temperature, and therefore, the determination at S9 may be performed by determining whether the exhaust gas temperature detected by either one of the temperature sensors 43 and 44 provided near the exhaust emission control catalyst 41 is higher than the predetermined temperature.

If the result of the determination at S9 is positive, the control proceeds to S17 illustrated in FIG. 5, and whether the exhaust emission control catalyst 41 is deteriorated is determined. Hereinafter, the description is given about FIG. 5.

First, at S17, a value of a supply reaction heat rate ΔQdoc#in estimated to be produced per unit time by the non-deteriorated exhaust emission control catalyst (a supply reaction heat rate per unit time which is sequentially calculated in the routine (R2) in FIG. 6 described later) and a value of a reaction heat rate ΔQdoc actually produced per unit time in the exhaust emission control catalyst (a reaction heat rate per unit time which is sequentially calculated in the routine (R3) in FIG. 7 described later) are read. Then ΔQdoc#in is added to Qdoc#in which is a previous integrated value of the supply reaction heat rates, and the result thereof serves as a current supply reaction heat rate Qdoc#in (latest integrated value of the supply reaction heat rates). ΔQdoc is added to Qdoc which is a previous integrated value of the reaction heat rates, and the result thereof serves as a latest reaction heat rate integrated value Qdoc. These updates are repeated until the integrating time length reaches 60 s or longer (S17 to S19). Note that each of initial values of Qdoc and Qdoc#in is set to zero before the diagnosis is started (since the values of Qdoc and Qdoc#in are reset to zero when the diagnosis completes, as described later at S18). Instantaneous values, such as ΔQdoc and ΔQdoc#in, vary easily due to, for example, the change of the operating state of the engine, and therefore, in this embodiment, the diagnosis is performed by using Qdoc and Qdoc#in which are the integrated values of ΔQdoc and ΔQdoc#in in the predetermined time period. Note that, as described above, in this first embodiment, Qdoc corresponds to the actual exhaust-emission-control-catalyst temperature parameter and Qdoc#in corresponds to the diagnostic temperature parameter threshold. Subsequently, the ΔQdoc calculation method is described with reference to FIG. 6, and the ΔQdoc#in calculation method is described with reference to FIG. 7.

Figure 6:
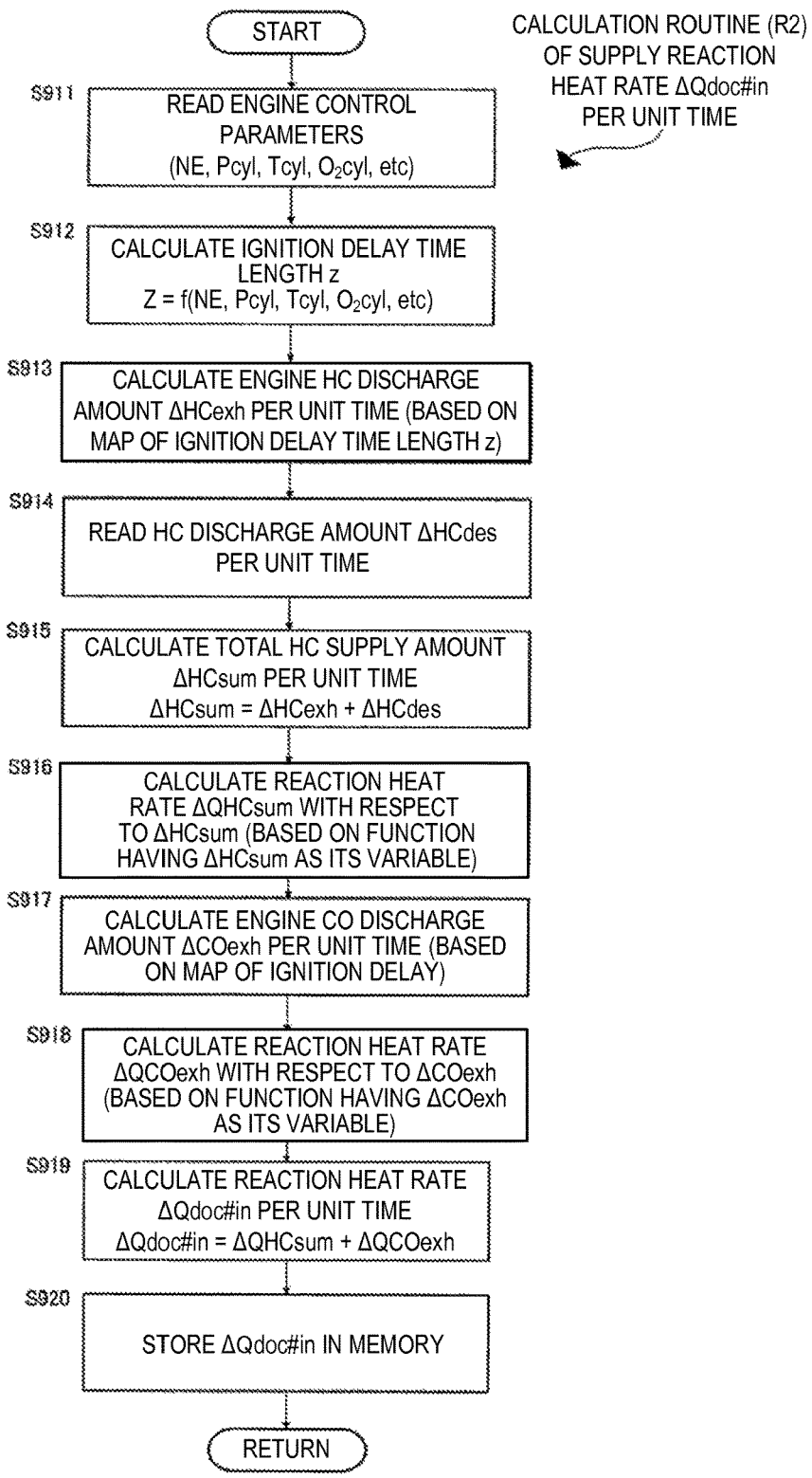
FIG. 6 is a flowchart of a subroutine (R2) for calculating a supply reaction heat rate (ΔQdoc#in) per unit time.

FIG. 6 is a flowchart of a subroutine for calculating the supply reaction heat rate ΔQdoc#in per unit time. First, at S911, an engine speed NE detected by the engine speed sensor 39, an in-cylinder pressure Pcyl at a piston top dead center (the pressure at the end of compression stroke) calculated based on the various sensor signals, an in-cylinder temperature Tcyl at the piston top dead center, and an in-cylinder $O_2$ concentration $O_2$cyl are read. Although the method of calculating the in-cylinder pressure Pcyl and the in-cylinder temperature Tcyl is not particularly limited, since the in-cylinder pressure Pcyl and the in-cylinder temperature Tcyl correlate with parameters regarding the engine operation, such as the geometric compression ratio, the intake air temperature, an atmospheric pressure (or an intake air pressure), the engine fluid temperature, an effective compression ratio, the engine load, the fuel injection amount, and a fuel injection pressure, these parameters are detected or estimated by using the various sensors, and each of the in-cylinder pressure Pcyl and the in-cylinder temperature Tcyl may be calculated by using either one of a function and a map determined beforehand for the detected value or the estimated value by, for example, an experiment. Specifically, the in-cylinder pressure Pcyl and the in-cylinder temperature Tcyl are calculated to become higher as any one of the intake air temperature, the engine fluid temperature, the effective compression ratio, and the engine load becomes higher.

Moreover, although the in-cylinder $O_2$ concentration calculation method is also not particularly limited, for example, it may be as follows. A fresh air amount passing through the air cleaner 31 is detected by the airflow sensor 32, and an intake $O_2$ concentration is calculated based on an $O_2$ concentration of fresh air stored in the memory 122 beforehand, the fresh air amount, the exhaust $O_2$ concentration detected by the linear $O_2$ sensor 46, an EGR gas amount calculated by, for example, a pressure sensor at a position upstream/ downstream of the EGR passage. A fill amount of intake air is calculated based on, for example, a volume efficiency set according to the engine operating state stored in the memory 122 beforehand, an in-cylinder remaining exhaust gas amount is calculated based on, for example, the exhaust gas pressure sensor 37, and an in-cylinder remaining exhaust gas $O_2$ concentration is estimated by the linear $O_2$ sensor 46. Then, the in-cylinder $O_2$ concentration $O_2$cyl is calculated based on the fill amount, the in-cylinder remaining exhaust gas amount, the intake $O_2$ concentration, and the in-cylinder remaining exhaust gas $O_2$ concentration.

Next, at S912, an ignition delay time length z is calculated. Here, the ignition delay time length z indicates a delay in time from the fuel injection until the fuel ignition, for example, in pre-mixture combustion, a time length from the end of a plurality of fuel injections performed at a predetermined time interval on the compression stroke until the fuel combusts by self-ignition near the TDC, and in diffusion combustion, a time length from a start of the main injection until the combustion starts. The ignition delay time length z can be calculated based on, for example, the in-cylinder pressure Pcyl, the in-cylinder temperature Tcyl, the engine speed NE (the detection value of the engine speed sensor 39), and the in-cylinder $O_2$ concentration $O_2$cyl. In other words, the ignition delay time length becomes shorter as the in-cylinder pressure Pcyl becomes higher and the in-cylinder temperature Tcyl becomes higher since self-ignition occurs more easily, the ignition delay time length becomes longer as the engine speed NE becomes higher since a period of time in which a temperature of mixture gas is high becomes shorter, and the ignition delay time length becomes longer as the in-cylinder $O_2$ concentration $O_2$cyl becomes lower (the EGR ratio is higher) since the combustion becomes harder to perform. Specifically, the ignition delay time length z can be calculated based on the following relation equation of the ignition delay time length z: $z=A \times Pcyl^B \times exp(1/Tcyl)^C \times NE^D \times O_2cyl^E$. The A, B, C, D, and E are constants and may be obtained by, for example, an experiment beforehand.

Next, at S913, the engine HC discharge amount ΔHCexh per unit time is calculated based on the ignition delay time length z. Specifically, when the ignition delay time length z is long and the ignition occurs at a timing later than a desired combustion timing on the expansion stroke, the fuel combustion becomes incomplete, and the amount of HC discharged from the engine becomes larger. Therefore, ΔHCexh is calculated to be larger as the ignition delay time length z becomes longer, based on either one of a map and a function determined by, for example, an experiment or theoretical values beforehand. Sequentially, at S914, the adsorbed-HC discharge amount ΔHCdes from the HC adsorbing part per unit time detected by the HC discharge amount calculating module 90 is read. Note that the adsorbed-HC discharge amount ΔHCdes calculation method is described later with reference to FIG. 10. Sequentially, at S915, the engine HC discharge amount ΔHCexh is added to the adsorbed-HC discharge amount ΔHCdes to calculate the total HC supply amount ΔHCsum to the exhaust emission control catalyst 41 per unit time. Next, at S916, a reaction heat rate ΔQHCsum is calculated. The reaction heat rate ΔQHCsum is estimated to be produced when the total HC supply amount ΔHCsum is supplied to the exhaust emission control catalyst 41 in the non-deteriorated state. ΔQHCsum may be calculated based on either one of a map of the total HC supply amount (ΔHCsum) and the reaction heat rate obtained by an experiment or theoretical values beforehand, and a function having the HC amount (ΔHCsum) as its variable.

Next, at S917, an engine CO discharge amount ΔCOexh per unit time is calculated based on the ignition delay time length z. Specifically, when the ignition delay time length z is long and the ignition occurs at a timing later than a desired combustion timing on the expansion stroke, the fuel combustion becomes incomplete and the amount of CO discharged from the engine becomes larger. Therefore, ΔCOexh is calculated to be larger as the ignition delay time length z becomes longer, based on either one of a map and a function determined by, for example, an experiment or theoretical values beforehand. Sequentially, at S918, a reaction heat rate ΔQCOexh estimated to be produced when ΔCOexh is supplied to the exhaust emission control catalyst in the non-deteriorated state is calculated. ΔQCOexh may be calculated based on either one of a map of the CO amount (ΔCOsum) and the reaction heat rate obtained by an experiment or theoretical values beforehand, and a function having the CO amount (ΔCOsum) as its variable. Then, at S919, the calculated ΔQHCsum and ΔQCOexh are added to calculate the supply reaction heat rate ΔQdoc#in per unit time, and at S920, this supply reaction heat rate ΔQdoc#in is stored as a latest value so as to be read at S17 in FIG. 5.

By calculating the total HC supply amount ΔHCsum supplied to the exhaust emission control catalyst while taking the adsorbed-HC discharge amount into consideration, and by calculating the supply reaction heat rate ΔQdoc#in per unit time based on the total HC supply amount ΔHCsum, the supply reaction heat rate ΔQdoc#in per unit time estimated to be produced by the exhaust emission control catalyst in the non-deteriorated state can be calculated more accurately, and the supply reaction heat rate Qdoc#in which is the integrated value of ΔQdoc#in in the predetermined time period can be calculated more accurately. Moreover, since the oxidative reaction heat rate produced by the engine CO discharge amount is taken into consideration in calculating ΔQdoc#in, ΔQdoc#in and Qdoc#in can be calculated more accurately.

Next, the detection method of the reaction heat rate ΔQdoc per unit time (the reaction heat rate actually produced in the exhaust emission control catalyst) is described with reference to FIG. 7.

Figure 7:
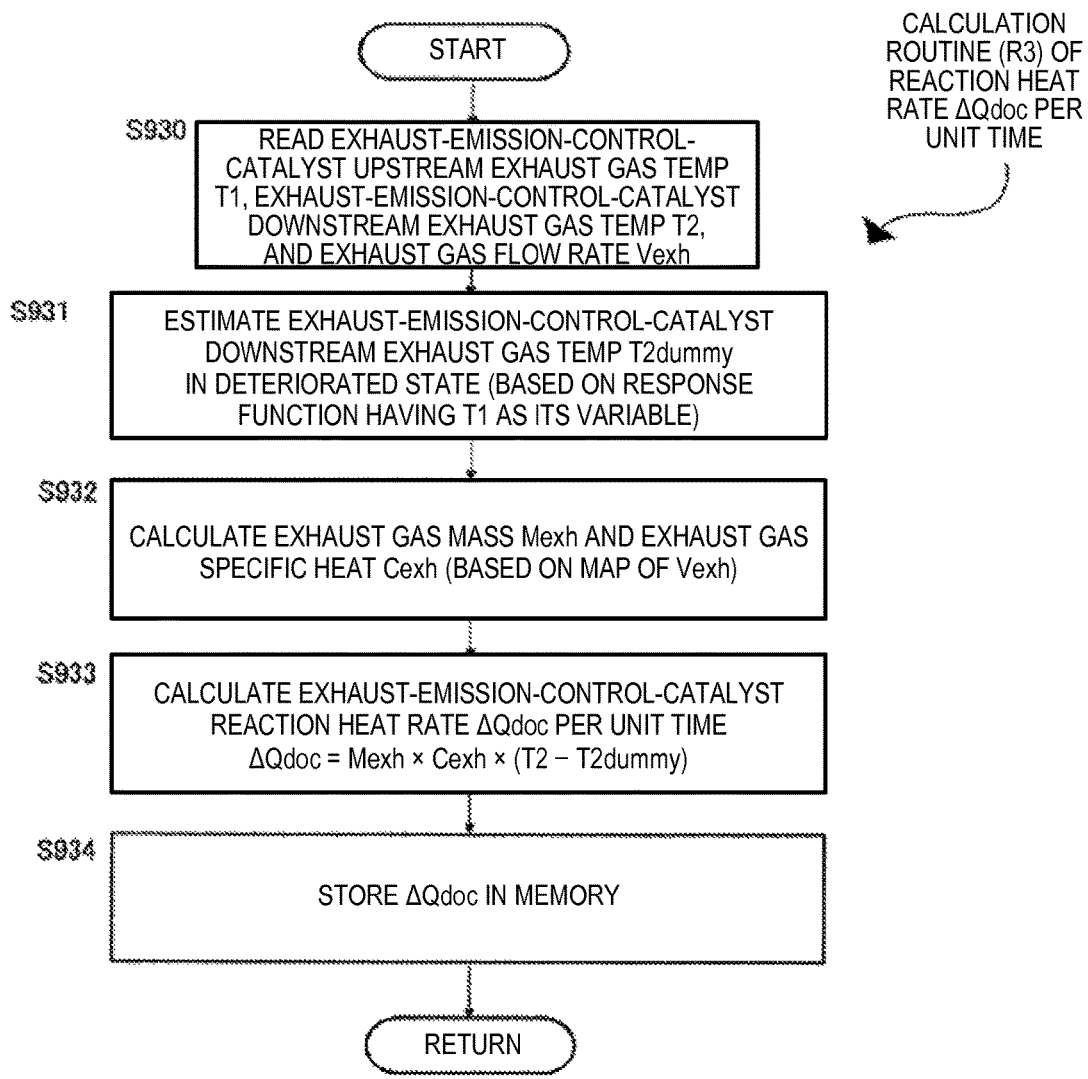
FIG. 7 is a flowchart of a subroutine (R3) for detecting a reaction heat rate (ΔQdoc) per unit time.

FIG. 7 is a flowchart of a subroutine for detecting the reaction heat rate ΔQdoc per unit time. First, at S930, an exhaust-emission-control-catalyst upstream exhaust gas temperature T1 detected by the exhaust-emission-control-catalyst upstream exhaust gas temperature sensor 43, an exhaust-emission-control-catalyst downstream exhaust gas temperature T2 detected by the exhaust-emission-control-catalyst downstream exhaust gas temperature sensor 44, and an exhaust gas flow rate Vexh detected by an exhaust gas flow rate detecting module 71 (described later) that is used with the HC discharge amount calculating module 90 are read. Note that a detection value from the exhaust gas flow rate detecting module 71 provided to an HC adsorbable ratio calculating module 91a (described later) may be read as the exhaust gas flow rate Vexh.

Next, at S931, the exhaust-emission-control-catalyst downstream exhaust gas estimated temperature T2dummy in the state where the oxidative reaction by the exhaust emission control catalyst does not occur, in other words, which does not include catalyst oxidative reaction temperature, is estimated. Although the estimation method of the exhaust-emission-control-catalyst downstream exhaust gas estimated temperature T2dummy is not particularly limited, in this embodiment, it is estimated based on a response function having T1 as its variable, T1 being set based on properties obtained by an experiment beforehand with a vehicle installed therein with a dummy catalyst which is a deteriorated exhaust emission control catalyst and where the oxidation reaction does not occur (e.g., an exhaust pipe, a thermal capacity of the exhaust emission control catalyst, and a thermal transfer ratio). Here, a blank time length for the exhaust gas to flow from a position where the exhaust-emission-control-catalyst upstream exhaust gas temperature sensor 43 for detecting T1 is disposed, to a position where the exhaust-emission-control-catalyst downstream exhaust gas temperature sensor 44 for detecting T2 is disposed is preferred to be taken into consideration. By considering such a blank time length, when calculating a difference between T2dummy and T2 to calculate the reaction heat rate Qdoc produced in the exhaust emission control catalyst at S933 described later, the moved position of exhaust gas can be matched between the cases of detecting T2dummy and T2, and therefore, the reaction heat rate Qdoc can be calculated more accurately.

Next, at S932, an exhaust gas mass Mexh and an exhaust gas specific heat Cexh are estimated based on the exhaust gas flow rate Vexh, and at S933, Mexh, Cexh, and the difference between T2 and T2dummy (T2−T2dummy) are calculated to obtain the reaction heat rate ΔQdoc per unit time. At S934, the reaction heat rate ΔQdoc per unit time is updated and stored in a predetermined memory so that the latest reaction heat rate ΔQdoc per unit time is read at S17 in FIG. 5.

By calculating the oxidative reaction heat rate in the exhaust emission control catalyst based on the difference between T2dummy and T2 as described above, the influence on the temperature increase by factors other than the oxidative reaction can be excluded, and therefore, the calculation of only the oxidative reaction heat rate can be performed more accurately. In other words, the influence of temperature change factors other than the oxidative reaction heat in the exhaust emission control catalyst, such as, the state of the exhaust gas and the heat being transferred to an exhaust emission control catalyst case, is included in T2 which is the detection value from the exhaust-emission-control-catalyst downstream exhaust gas temperature sensor 44. Thus, in this embodiment, firstly, the exhaust-emission-control-catalyst downstream exhaust gas temperature T2dummy which only includes the temperature change factors other than the oxidative reaction heat, in other words, which only excludes the temperature change of the oxidative reaction heat, is estimated, the reaction heat rate ΔQdoc per unit time is calculated by using the temperature T2−T2dummy obtained by subtracting T2dummy from T2 as the exhaust-emission-control-catalyst downstream exhaust gas temperature, so that the temperature change factors other than the oxidative reaction heat are excluded.

Next, at S17 in the main routine of FIG. 5, the latest ΔQdoc#in, which is calculated and stored in the subroutine of FIG. 6, is added to the previously calculated Qdoc#in so as to update Qdoc#in, and the latest Qdoc, which is calculated and stored in the subroutine of FIG. 7, is added to the previously calculated Qdoc so as to update Qdoc. Then, these updates are repeated until the integrating time length reaches 60 s (S17 to S19). In other words, since ΔQdoc#in and ΔQdoc vary due to, for example, the engine operating state, the deterioration diagnostic accuracy is improved by performing the integrations of Qdoc and Qdoc#in, respectively, for at least 60 s.

When the integrating time length is 60 s or longer, the control proceeds to S20, where it is determined whether T2dummy is higher than the predetermined value. In other words, when T2dummy is higher than the predetermined value (e.g., 200° C.), the exhaust emission control catalyst is in the activated state, and if the exhaust emission control catalyst is not deteriorated, the exhaust emission control catalyst is in the state where Qdoc including sufficient oxidative reaction heat can be obtained, and thus, Qdoc suitable for the diagnosis is considered as obtained and the control proceeds to S21. On the other hand, if T2dummy is lower than the predetermined value, the suitable Qdoc is considered as not obtained and the integrations of Qdoc and Qdoc#in at S17 and S18 are repeated until T2dummy becomes higher than the predetermined value. By repeating the integration of Qdoc until the sufficient Qdoc is obtained, the deterioration diagnostic accuracy is improved.

Sequentially, at S21, whether the integrating time length is 200 s or shorter is determined, and if it is 200 s or shorter, the control proceeds to S22; whereas if it exceeds 200 s, the timing is considered as not suitable for the diagnosis and the control proceeds to S26 where the diagnosis is suspended. In other words, when the integrating time length of Qdoc and Qdoc#in exceeds 200 s, there is a possibility that a total detection error of the exhaust-emission-control-catalyst upstream exhaust gas temperature sensor 43 and the exhaust-emission-control-catalyst downstream exhaust gas temperature sensor 44 which are used to calculate Qdoc and Qdoc#in respectively, becomes large and thus, the deterioration diagnostic accuracy may degrade. Therefore, the diagnosis is suspended when the diagnosing time (integrating time length) exceeds 200 s (S16), to end the diagnosis.

Next, at S22, whether Qdoc is lower than Qdoc#in by a predetermined value is determined, and if it is lower by the predetermined value, the oxidative reaction in the exhaust emission control catalyst is considered as excessively low and the deterioration of the exhaust emission control catalyst is determined (S23), and the alarm device is activated (S24). On the other hand, if Qdoc is not lower by the predetermined value, the oxidative reaction in the exhaust emission control catalyst is considered as sufficient and the exhaust emission control catalyst is determined as normal, in other words, not deteriorated (S25). Note that although the deterioration determination method based on the comparison between Qdoc and Qdoc#in described above is not particularly limited, the exhaust emission control catalyst may be determined as deteriorated, for example, when the difference between Qdoc and Qdoc#in is larger than a predetermined value or when a heat release ratio which is a ratio between Qdoc and Qdoc#in (=Qdoc/Qdoc#in) is lower than a predetermined value.

By performing the deterioration determination through comparing the supply reaction heat rate Qdoc#in (diagnostic temperature parameter threshold) estimated to be produced by the exhaust emission control catalyst in the non-deteriorated state, which includes the HC discharged from the HC adsorbing part 41c, with the reaction heat rate Qdoc (actual exhaust-emission-control-catalyst temperature parameter), which is actually produced in the exhaust emission control catalyst as described above, the influence of the HC discharged from the HC adsorbing part is excluded, and therefore, the false deterioration determination of the exhaust emission control catalyst due to the addition of the oxidative reaction heat produced by the HC discharged from the HC adsorbing part can be prevented. Specifically, the exhaust gas temperature detected by the temperature sensor 44 downstream of the exhaust emission control catalyst is a temperature influenced by the oxidative reaction heat which is produced by the HC discharged from the HC adsorbing part, and the detected Qdoc which is the actual exhaust-emission-control-catalyst temperature parameter detected based on this exhaust gas temperature, includes the reaction heat rate influenced by the oxidative reaction heat produced by the HC discharged from the HC adsorbing part. On the other hand, by using, as the diagnostic temperature parameter threshold, the supply reaction heat rate Qdoc#in estimated to be produced by the exhaust emission control catalyst based on the calculation taking the adsorbed-HC discharge amount into consideration, and determining the deterioration through comparing Qdoc#in with Qdoc, both of Qdoc#in and Qdoc serve as parameters including the HC discharged from the HC adsorbing part, and therefore, the diagnosis taking the addition of the oxidative reaction heat produced by the HC discharged from the HC adsorbing part into consideration can be performed. Moreover, with the method of this embodiment, regardless of the adsorbed-HC discharge amount, the false deterioration determination due to the HC discharged from the HC adsorbing part can be prevented, and therefore, limitation in the diagnosis executing conditions, for example, the diagnosis is limited when the adsorbed-HC discharge amount is large, is not required and the diagnostic frequency can be secured.

Note that in this embodiment, the supply reaction heat rate Qdoc#in when the exhaust emission control catalyst is in the non-deteriorated state is used as the diagnostic temperature parameter threshold; however, the supply reaction heat rate Qdoc#in when the exhaust emission control catalyst is deteriorated to a predetermined level may be used. In this case, either one of a function and a map used for calculating the reaction heat rate $\Delta HCsum$ with respect to the total HC supply amount at S916 in the subroutine of FIG. 6 and the reaction heat rate with respect to the engine CO discharge amount $\Delta COexh$ at S918 may be set based on the relationship between $\Delta HCsum$ and the reaction heat rate and the relationship between $\Delta COexh$ and the reaction heat rate obtained by an experiment using the exhaust emission control catalyst deteriorated to a predetermined level. Here, the deterioration determination may be performed when the difference between Qdoc and Qdoc#in is smaller than the predetermined value. Moreover, in this embodiment, Qdoc which is the integrated value of $\Delta Qdoc$ is used as the actual exhaust-emission-control-catalyst temperature parameter and Qdoc#in which is the integrated value of $\Delta Qdoc\#in$ is used as the diagnostic temperature parameter threshold; however, to simplify the control, $\Delta Qdoc$ may be used as the actual exhaust-emission-control-catalyst temperature parameter and $\Delta Qdoc\#in$ may be used as the diagnostic temperature parameter threshold, and alternatively, to further simplify the control, the detection value T2 from the exhaust-emission-control-catalyst downstream exhaust gas temperature sensor 44 may be the actual exhaust-emission-control-catalyst temperature parameter and the exhaust-emission-control-catalyst downstream exhaust gas temperature estimated value calculated based on the adsorbed-HC discharge amount may be the diagnostic temperature parameter threshold.

Moreover, in this first embodiment, in calculating the supply reaction heat rate Qdoc#in which is the diagnostic temperature parameter threshold, the adsorbed-HC discharge amount $\Delta HCdes$ per unit time is read sequentially (S914), and the reaction heat rate $\Delta QHCsum$ per unit time containing $\Delta HCdes$ is calculated sequentially (S916); however, it may be such that a fixed value of the diagnostic temperature parameter threshold is stored in the memory 122 beforehand, the adsorbed-HC discharge amounts $\Delta HCdes$ per unit time are integrated, a correction coefficient may be calculated by using either one of a map and a function of the correction coefficient for the adsorbed-HC discharge amount integrated value obtained by an experiment or the like beforehand, and then a diagnostic temperature parameter threshold which is the fixed value corrected based on the correction coefficient is compared to the actual exhaust-emission-control-catalyst temperature parameter to determine the deterioration of the exhaust emission control catalyst.

Figure 8:
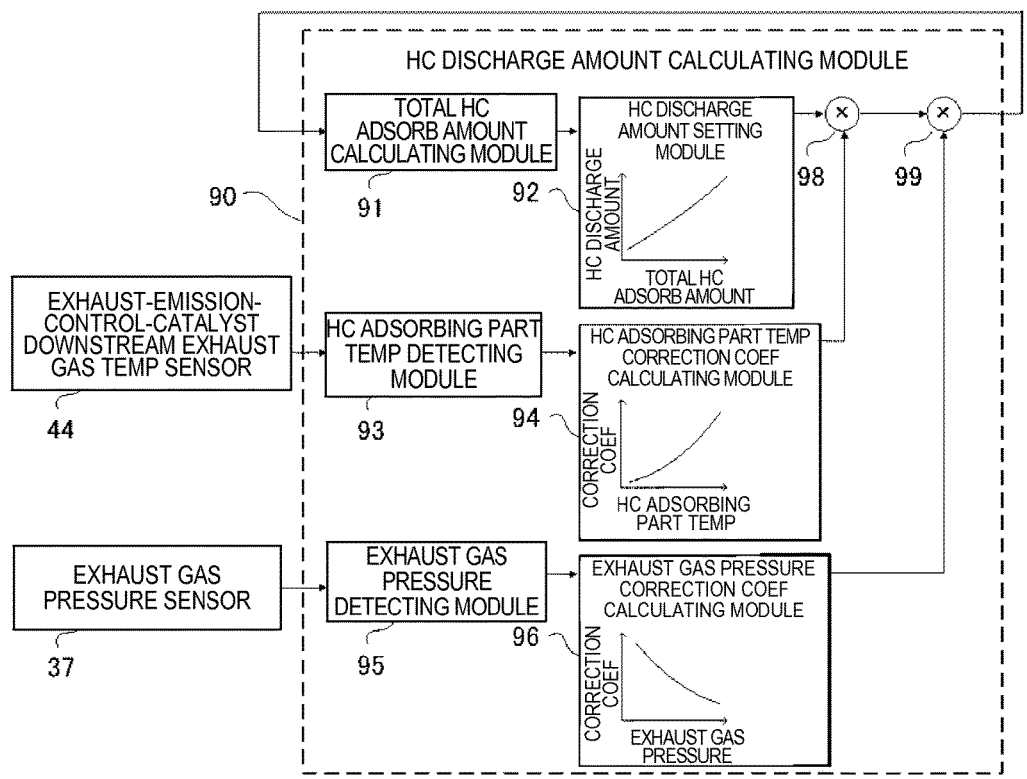
FIG. 8 is a detailed block diagram illustrating an HC discharge amount calculating module.

On the other hand, when preventing, with the method described above, the false determination of the deterioration determining module which is caused by the increase of the actual exhaust-emission-control-catalyst temperature parameter due to the HC discharged from the HC adsorbing part, it becomes important to calculate the adsorbed-HC discharge amount per unit time accurately. Thus, in this embodiment, the adsorbed-HC discharge amount per unit time is calculated with the following method. FIG. 8 is a block diagram of the HC discharge amount calculating module 90. The HC discharge amount calculating module 90 includes a total HC adsorb amount calculating module 91 for estimating that a total HC adsorb amount adsorbed by the HC adsorbing part is larger than a second value, an HC discharge amount setting module 92 for receiving a signal from the total HC adsorb amount calculating module 91 and setting the adsorbed-HC discharge amount, an HC adsorbing part temperature detecting module 93 for receiving the signal from the exhaust-emission-control-catalyst downstream exhaust gas temperature sensor 44 and calculating the temperature of the HC adsorbing part, an HC adsorbing part temperature correction coefficient calculating module 94 for receiving a signal from the HC adsorbing part temperature detecting module 93 and calculating an adsorbing part temperature correction coefficient, an exhaust gas pressure detecting module 95 for receiving the signal from the exhaust gas pressure sensor 37 and calculating an exhaust gas pressure at the entrance of the exhaust emission control catalyst 41, an exhaust gas pressure correction coefficient calculating module 96 for receiving a signal from the exhaust gas pressure detecting module 95 and calculating the exhaust gas pressure correction coefficient, a multiplying module 98 for multiplying the adsorbed-HC discharge amount set by the HC discharge amount setting module 92 by the correction coefficient calculated by the HC adsorbing part temperature correction coefficient calculating module 94, and a multiplying module 99 for multiplying the calculated value from the multiplying module 98 by the correction coefficient calculated by the exhaust gas pressure correction coefficient calculating module 96.

The adsorbed-HC discharge amount per unit time increases as the total HC adsorb amount becomes larger. Moreover, the adsorbed-HC discharge amount per unit time correlates with the HC adsorbing part temperature, and the adsorbed-HC discharge amount per unit time increases as the HC adsorbing part temperature becomes higher since a desorbing speed of the adsorbed HC becomes higher. Moreover, the adsorbed-HC discharge amount per unit time correlates with the exhaust gas pressure, and the adsorbed-HC discharge amount per unit time becomes larger as the exhaust gas pressure becomes lower. In other words, since the adsorption of HC is achieved by the crystal part (e.g., zeolite) being chemically coupled to HC and the HC is discharged when it is uncoupled and the temperature reaches to a level where it can be desorbed (boiling point), when the exhaust gas pressure is high and the pressure at the HC adsorbing part is high, the boiling point at which HC can be desorbed rises and it becomes difficult to discharge HC. Thus, the adsorbed-HC discharge amount per unit time becomes smaller. Therefore, a base value of the adsorbed-HC discharge amount with respect to the total HC adsorb amount is set by the HC discharge amount setting module 92, the HC adsorbing part temperature correction coefficient is calculated by the HC adsorbing part temperature correction coefficient calculating module so that the adsorbed-HC discharge amount per unit time becomes larger as the HC adsorbing part temperature becomes higher, and the exhaust gas pressure correction coefficient is calculated by the exhaust gas pressure coefficient calculating module 96 so that the correction coefficient becomes smaller as the exhaust gas pressure becomes higher. By multiplying the base value of the adsorbed-HC discharge amount by these correction coefficients, the adsorbed-HC discharge amount per unit time is calculated.

By calculating the adsorbed-HC discharge amount per unit time based on the total HC adsorb amount correlating with the adsorbed-HC discharge amount per unit time, the HC adsorbing part temperature, and the exhaust gas pressure, the calculation accuracy of adsorbed-HC discharge amount per unit time improves and accordingly, the false deterioration determination of the exhaust emission control catalyst due to the HC discharged from the HC adsorbing part can be prevented more surely.

In this embodiment, the HC adsorbing part temperature which is the parameter used for the calculation of the adsorbed-HC discharge amount per unit time is estimated by the detection value of the exhaust-emission-control-catalyst downstream exhaust gas temperature sensor 44; however, the HC adsorbing part temperature may be the actual measured temperature of the HC adsorbing part, and may be estimated based on the exhaust gas temperature at the position upstream of the exhaust emission control catalyst correlating with the HC adsorbing part temperature, or alternatively, may be estimated based on the operating state of the engine. Moreover, to simplify the control, the HC adsorbing part temperature may be substituted by the parameter correlating with the HC adsorbing part temperature, such as the exhaust-emission-control-catalyst downstream exhaust gas temperature correlating with the HC adsorbing part temperature. Furthermore, in this embodiment, in calculating the adsorbed-HC discharge amount per unit time, the base value of the adsorbed-HC discharge amount calculated based on the total HC adsorb amount which has the largest influence is multiplied by the HC adsorbing part temperature correction coefficient and the exhaust gas pressure correction coefficient to calculate the adsorbed-HC discharge amount per unit time; however, the base value of the adsorbed-HC discharge amount may be calculated based on either one of the HC adsorbing part temperature and the exhaust gas pressure, and corrected by being multiplied by the correction coefficient regarding other kind of parameters, and the adsorbed-HC discharge amount per unit time may be calculated by using a map including the total HC adsorb amount, the HC adsorbing part temperature, and the exhaust gas pressure.

Figure 9:
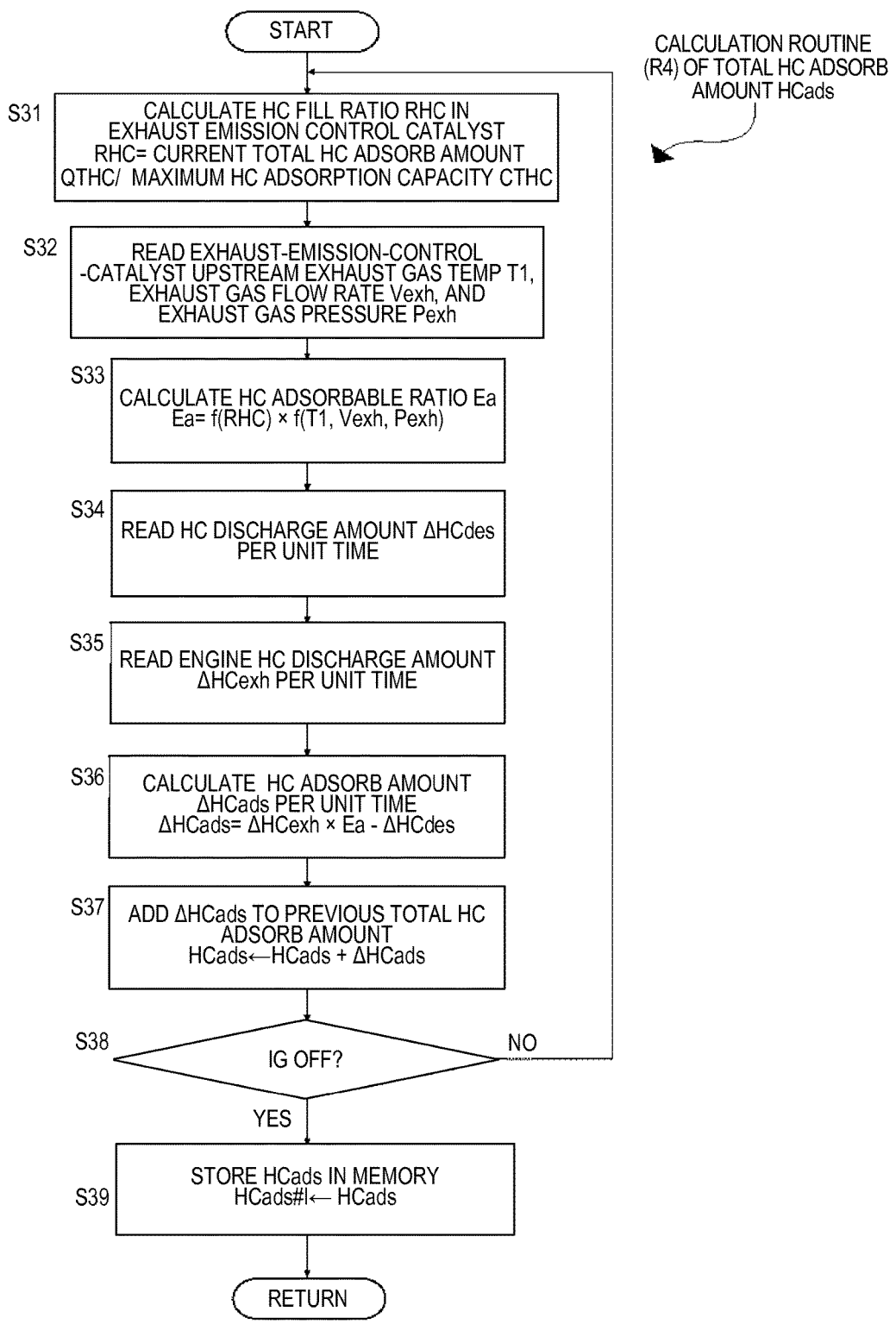
FIG. 9 is a flowchart of a subroutine (R4) for calculating a total HC adsorb amount (HCads).

On the other hand, when the adsorbed-HC discharge amount is calculated with the method described above, it becomes important to accurately calculate the total HC adsorb amount. Thus, in this embodiment, the total HC adsorb amount is calculated sequentially with the method in FIG. 9. FIG. 9 is a flowchart of a subroutine (R4) for calculating the total HC adsorb amount (HCads). S32 and S33 are related to calculating an HC adsorbable ratio Ea. First, at S31, a current HC fill ratio RHC in the exhaust emission control catalyst is calculated based on a maximum HC adsorption capacity CTHC stored in the memory 122 beforehand and a latest total HC adsorb amount also stored in the memory 122. Next, at S32, the exhaust gas temperature T1, the exhaust gas flow rate Vexh detected by an exhaust gas flow rate detecting module (described later), and the exhaust gas pressure Pexh obtained from the signal of the exhaust gas pressure sensor 37 are read, and the HC adsorbable ratio Ea is calculated at S33. Next, the calculation method of the HC adsorbable ratio Ea is described in detail with reference to FIG. 10.

Figure 10:
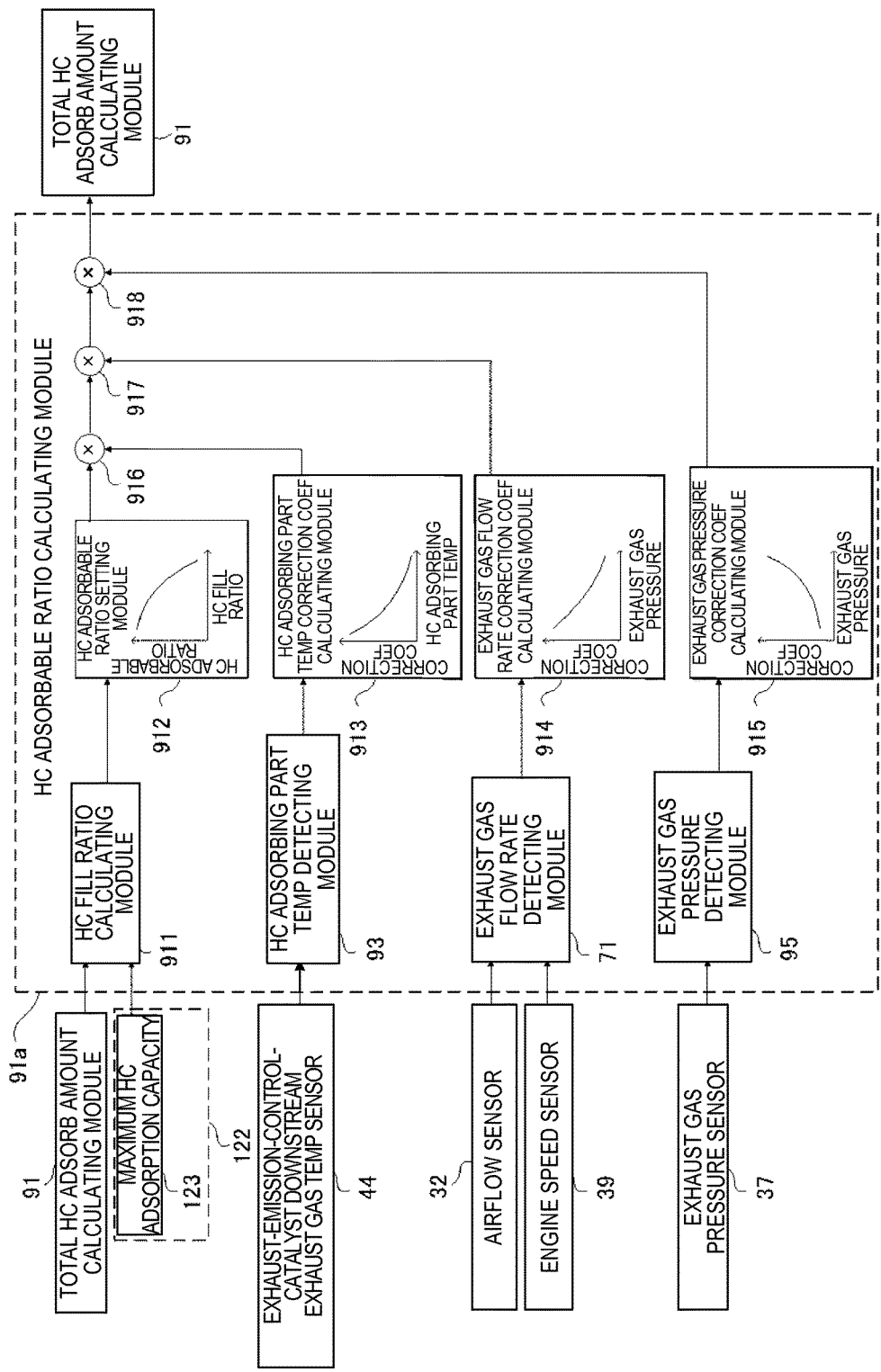
FIG. 10 is a detailed block diagram illustrating an HC adsorbable ratio (Ea) calculating module.

FIG. 10 is a detailed block diagram illustrating an HC adsorbable ratio (Ea) calculating module. The HC adsorbable ratio calculating module 91a includes an HC fill ratio calculating module 911, an HC adsorbable ratio setting module 912, the HC adsorbing part temperature detecting module 93, an HC adsorbing part temperature correction coefficient calculating module 913, the exhaust gas flow rate detecting module 71, an exhaust gas flow rate correction coefficient calculating module 914, the exhaust gas pressure detecting module 95, an exhaust gas pressure correction coefficient calculating module 915, and multiplying modules 916 to 918. The HC fill ratio calculating module 911 calculates the HC fill ratio based on the total HC adsorb amount calculated previously and the maximum HC adsorption capacity 123 stored in the memory 122. The HC adsorbable ratio setting module 912 receives a signal from the HC fill ratio calculating module 911 and sets a base value of the HC adsorbable ratio. The HC adsorbing part temperature detecting module 93 receives the signal from the exhaust-emission-control-catalyst downstream temperature sensor 44 and estimates the HC adsorbing part temperature. The HC adsorbing part temperature correction coefficient calculating module 913 receives the signal from the HC adsorbing part temperature detecting module 93 and calculates the HC adsorbing part temperature correction coefficient. The exhaust gas flow rate detecting module 71 receives the signals from the airflow sensor 32 and the engine speed sensor 39 and estimates the exhaust gas flow rate. The exhaust gas flow rate correction coefficient calculating module 914 receives the signal from the exhaust gas flow rate detecting module 71 and calculates the exhaust gas flow rate correction coefficient. The exhaust gas pressure detecting module 95 receives the signal from the exhaust gas pressure sensor 37 and detects the exhaust gas pressure at the entrance of the exhaust emission control catalyst. The exhaust gas pressure correction coefficient calculating module 915 receives the signal from the exhaust gas pressure detecting module 95 and calculates the exhaust gas pressure correction coefficient. The multiplying modules 916 to 918 multiply the base value of the HC adsorbable ratio, which is calculated by the HC adsorbable ratio setting module 912, by the correction coefficients calculated by the correction coefficient calculating modules 913 to 915, respectively. Thus, the latest value of the HC adsorbable ratio Ea is calculated, stored in the memory 122, and read at S33 in the flowchart of the total HC adsorb amount calculation in FIG. 9.

The HC adsorbable ratio Ea which is the ratio of an adsorbable HC amount with respect to the total HC amount supplied to the HC adsorbing part correlates with the calculated total HC adsorb amount, the exhaust gas pressure, the HC adsorbing part temperature, and the exhaust gas flow rate. In other words, since the adsorption of HC is performed in a crystal portion where HC is not adsorbed, when the total HC adsorb amount is large, the crystal portion where HC is not adsorbed becomes small, and the HC adsorbable ratio becomes low. Moreover, as the HC adsorbing part temperature becomes higher, since HC becomes easier to be discharged as described above, HC becomes difficult to be adsorbed and the HC adsorbable ratio becomes lower. Moreover, as the exhaust gas flow rate becomes higher, since the flow speed of the exhaust gas becomes higher and the required time for HC discharged from the engine to pass through the HC adsorbing part becomes short, the HC adsorbable ratio becomes lower. Furthermore, as the exhaust gas pressure becomes higher, the pressure in the adsorbing part becomes higher and, thus, the boiling point at which HC is desorbed rises and HC becomes difficult to be discharged, which allows HC to be adsorbed more easily. Thus, the HC adsorbable ratio becomes higher. Therefore, as described above, the HC adsorbable ratio calculating module 91a calculates the HC adsorbable ratio to be higher as the total HC adsorb amount of the total HC adsorb amount calculating module becomes smaller, calculates the HC adsorbable ratio to be higher as the HC adsorbing part temperature of the HC adsorbing part temperature detecting module becomes lower, and calculates the HC adsorbable ratio to be higher as the exhaust gas pressure of the exhaust gas pressure detecting module becomes higher.

Specifically, by calculating the HC adsorbable ratio based on the calculated total HC adsorb amount, the exhaust gas pressure, the HC adsorbing part temperature, and the exhaust gas flow rate correlating with the HC adsorbable ratio Ea, the HC adsorbable ratio is calculated more accurately. Accordingly, the total HC adsorb amount and the adsorbed-HC discharge amount are calculated more accurately; therefore, the more accurate oxidative reaction heat added by the HC discharged from the HC adsorbing part is taken into consideration, and the false deterioration determination of the exhaust emission control catalyst due to the HC discharged from the HC adsorbing part can be prevented more surely.

Note that the exhaust gas flow rate detecting module 71 performs the estimation based on the airflow sensor 32 and the engine speed sensor in this embodiment; however, it may perform the estimation by using other parameter regarding the operating state of the engine (e.g., the injection amount of fuel by the injector 18), or by using an actually measured value obtained by a flow rate sensor. Moreover, in this embodiment, in calculating the HC adsorbable ratio, the HC adsorbable ratio is calculated by multiplying the base value of the HC adsorbable ratio calculated based on the HC fill ratio having the largest influence by the HC adsorbing part temperature correction coefficient, the exhaust gas flow rate correction coefficient, and the exhaust gas pressure correction coefficient; however, it may be calculated by calculating the base value of the HC adsorbable ratio based on any one of the HC adsorbing part temperature, the exhaust gas flow rate, and the exhaust gas pressure, and multiplying the base value of the HC adsorbable ratio by the correction coefficient regarding other parameter, or may be calculated by using a map including the HC fill ratio, the HC adsorbing part temperature, the exhaust gas flow rate, and the exhaust gas pressure.

The description returns to the flowchart of the subroutine for the total HC adsorb amount calculation in FIG. 9. After the adsorbable ratio Ea calculated with the method described above is read (S33), at S34, the adsorbed-HC discharge amount ΔHCdes per unit time calculated by the HC discharge amount calculating module 90 and the engine HC discharge amount ΔHCexh calculated by an engine HC discharge amount calculating module provided to the diagnostic temperature parameter threshold setting module 100 are read (S35), and the HC adsorb amount ΔHCads per unit time is calculated by subtracting the adsorbed-HC discharge amount ΔHCdes from a value obtained by multiplying the engine HC discharge amount ΔHCexh by the HC adsorbable ratio Ea (S36). Then, the total HC adsorb amount is updated by adding the HC adsorb amount ΔHCads per unit time to the previous total HC adsorb amount HCads (S37), and by repeating the update until the IG is turned off, the total HC adsorb amount HCads is calculated sequentially (S31 to S38). Moreover, when turning the IG off, HCads before turning the IG off is stored in the memory 122 (S39), so that when the engine is started next time, HCads#1 stored in the memory 122 can be set as the initial value of the total HC adsorb amount (S1 to S3 in FIG. 4).

Specifically, at S31 to S36, since ΔHCads is calculated based on the HC adsorbable ratio Ea, the engine HC discharge amount ΔHCexh per unit time, and the adsorbed-HC discharge amount ΔHCdes per unit time which influence the HC adsorb amount ΔHCads per unit time, the HC adsorb amount ΔHCads per unit time and HCads which is the integrated value of ΔHCads are calculated more accurately, accordingly, the calculation accuracy of the adsorbed-HC discharge amounts per unit time improves, and the calculation accuracy of the diagnostic temperature parameter threshold Qdoc#in improves. Moreover, by storing, in the memory 122, ΔHCads immediately after the IG is turned off at S39, the total HC adsorb amount calculation error when the engine is started again can be reduced. In other words, when the engine is stopped before reaching the temperature at which HC is discharged, since HC remains adsorbed by the HC adsorbing part, the HC adsorb amount before the engine is stopped is stored at S39, and when the engine is started next time, the current total HC adsorb amount is calculated while the HC which is adsorbed before the engine is stopped is considered still remaining (S2). Therefore, an error of the total HC adsorb calculation value is reduced, and thus, the calculation accuracy of the total HC adsorb amount improves.

In other words, by using the exhaust emission control catalyst deterioration diagnosing method of this embodiment, the false deterioration determination of the exhaust emission control catalyst due to the HC discharged from the HC adsorbing part can be prevented more surely.

Although the preferred embodiment of the present invention is described above, the present invention may suitably be modified. For example, the diagnostic temperature parameter threshold to be used in the deterioration diagnosis may be a fixed value (which does not change depending on the HC discharge amount from the HC adsorbing part 41c). Obviously, the aim of the present invention is not limited to the matters explicitly described here, and it implicitly includes providing what is described as advantageous and/or effective.

As described above, according to the present invention, the deterioration diagnosis of the exhaust emission control catalyst provided with the HC adsorbing part can be performed more accurately, and the present invention can suitably be used in the field of methods and systems for diagnosing deterioration of oxidation catalysts provided with HC adsorbing parts.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Diesel Engine
10 PCM
32 Airflow Sensor
34 Intake Pressure Sensor
35 Intake Air Temperature Sensor
36 Fluid Temperature Sensor
37 Exhaust Gas Pressure Sensor
39 Engine Speed Sensor (Crank Angle Sensor)
40 Exhaust Passage 41 Exhaust Emission Control Catalyst (Oxidation Catalyst)
41a Carrier
41b Oxidation Catalyst Part
41c HC Adsorbing Part
42 Diesel Particulate Filter (DPF)
43 Exhaust-emission-control-catalyst Upstream Exhaust Gas Temperature Sensor
44 Exhaust-emission-control-catalyst Downstream Exhaust Gas Temperature Sensor
45 DPF Pressure Difference Sensor
46 Linear $O_2$ Sensor
71 Exhaust Gas Flow Rate Detecting Module
80 Actual Exhaust-emission-control-catalyst Temperature Parameter Detecting Module (Parameter Detecting Module)
90 HC Discharge Amount Calculating Module
91 Total HC Adsorb Amount Calculating Module
91a HC Adsorbable Ratio Calculating Module
93 HC Adsorbing Part Temperature Detecting Module
95 Exhaust Gas Pressure Detecting Module
100 Diagnostic Temperature Parameter Threshold Setting Module
110 Deterioration Determining Module (Deterioration Diagnosing Module)
121 CPU
122 Memory
130 Alarm Device

What is claimed is:

1. A method of diagnosing deterioration of an exhaust emission control catalyst including an HC (hydrocarbon) adsorbing part and an oxidation catalyst part, the HC adsorbing part disposed inside an exhaust passage of an engine and for adsorbing HC within exhaust gas when a temperature of the HC adsorbing part is lower than an HC dischargeable temperature and discharging the adsorbed HC when the temperature of the HC adsorbing part is the HC dischargeable temperature or higher, the oxidation catalyst part for purifying, by oxidation, the HC discharged from the HC adsorbing part and the HC within the exhaust gas under a high temperature, the method being executed via processing circuitry operatively coupled to first and second exhaust gas temperature sensors, the method comprising:

estimating that a first condition is satisfied, the first condition being that an HC discharge amount discharged from the HC adsorbing part is larger than a first value;

receiving actual upstream exhaust gas temperature data from the first exhaust gas temperature sensor operatively coupled to the processing circuitry and provided upstream of the exhaust emission control catalyst in the exhaust passage, and actual downstream exhaust gas temperature data from the second exhaust gas temperature sensor operatively coupled to the processing circuitry and provided downstream of the exhaust emission control catalyst in the exhaust passage;

determining a parameter relating to a reaction heat of the exhaust emission control catalyst based on the actual upstream exhaust gas temperature data from the first exhaust gas temperature sensor and the actual downstream exhaust gas temperature data from the second exhaust gas temperature sensor by performing calculations;

determining that the determined parameter indicates a temperature value lower than a predetermined threshold;

determining that a third condition is satisfied, the third condition being that a total amount of unburned fuel is larger than a third value;

performing a deterioration diagnosis by diagnosing that the exhaust emission control catalyst is deteriorated responsive to determining that the determined parameter indicates a temperature value lower than the predetermined threshold and determining the first condition and the third condition are satisfied; and responsive to performing the deterioration diagnosis, activating an alarm, wherein the calculations include:
estimating a hypothetical downstream exhaust gas temperature in a hypothetical state where the catalyst is deteriorated to an extent that oxidation reaction no longer occurs; and based on the actual downstream exhaust gas temperature data, calculating a difference between the hypothetical downstream exhaust gas temperature and an actual downstream exhaust gas temperature to determine the parameter.

2. The method of claim 1, further comprising estimating that a total HC adsorb amount adsorbed by the HC adsorbing part is larger than a second value;

determining that the total HC absorb amount is larger than the second value, thereby satisfying a second condition that the total HC absorb amount is larger than the second value; and performing the deterioration diagnosis responsive to determining that the determined parameter indicates a temperature value lower than the predetermined threshold and satisfying the first condition, the second condition, and the third condition.

3. The method of claim 1, further comprising detecting that the engine is in a cold-start state;

determining that the first condition is satisfied for the first time after the engine is detected to be in the cold-start state, thereby satisfying a fourth condition that the first condition is satisfied for the first time after the engine is detected to be in the cold-start state; and performing the deterioration diagnosis responsive to determining that the determined parameter indicates a temperature value lower than the predetermined threshold and satisfying the first condition, the third condition, and the fourth condition.

4. The method of claim 1, further comprising detecting that a temperature of the exhaust gas is higher than a predetermined temperature;

determining that the exhaust gas temperature is higher than the predetermined temperature, thereby satisfying a fifth condition that the exhaust gas temperature is higher than the predetermined temperature; and performing the deterioration diagnosis responsive to determining that the determined parameter indicates a temperature value lower than the predetermined threshold and satisfying the first condition, the third condition, and the fifth condition.

5. The method of claim 1, further comprising detecting a pressure of the exhaust gas discharged from the engine, wherein an estimated HC discharge amount becomes larger as a detected exhaust gas pressure becomes lower.

* * * * *